(12) United States Patent
Kato et al.

(10) Patent No.: US 7,336,580 B2
(45) Date of Patent: Feb. 26, 2008

(54) OPTICAL RECORDING METHOD, OPTICAL RECORDER, AND OPTICAL RECORDING MEDIUM

(75) Inventors: Tatsuya Kato, Tokyo (JP); Hiroshi Shingai, Tokyo (JP)

(73) Assignee: TDK Corporation, Tokyo (JP)

( * ) Notice: Subject to any disclaimer, the term of this patent is extended or adjusted under 35 U.S.C. 154(b) by 771 days.

(21) Appl. No.: 10/468,202

(22) PCT Filed: Feb. 14, 2002

(86) PCT No.: PCT/JP02/01234

§ 371 (c)(1),
(2), (4) Date: Jan. 8, 2004

(87) PCT Pub. No.: WO02/065462

PCT Pub. Date: Aug. 22, 2002

(65) Prior Publication Data

US 2004/0136305 A1 Jul. 15, 2004

(30) Foreign Application Priority Data

Feb. 14, 2001 (JP) ............................. 2001-037746

(51) Int. Cl.
*G11B 7/00* (2006.01)

(52) U.S. Cl. ................. 369/59.11; 369/47.53; 369/13.24; 369/116

(58) Field of Classification Search ............ 369/59.11, 369/47.53, 13.24, 116, 59.12, 59.25
See application file for complete search history.

(56) References Cited

U.S. PATENT DOCUMENTS 5,905,695 A * 5/1999 Kimura ................... 369/13.24
6,246,661 B1 * 6/2001 Toda et al. ................. 369/116

FOREIGN PATENT DOCUMENTS

| EP | 0802531 A2 | 10/1997 |
|---|---|---|
| JP | 9-282661 | 10/1997 |
| JP | 10-106008 | 4/1998 |

(Continued)

*Primary Examiner*—Andrea Wellington
*Assistant Examiner*—Kim-Kwok Chu
(74) *Attorney, Agent, or Firm*—Seed IP Law Group PLLC

(57) ABSTRACT

The object of the present invention is to provide an optical recording method for recording data in an optical recording medium, which can reduce jitter of a reproduced signal even in the case where data are recorded at a plurality of linear recording velocities.

The optical recording method according to the present invention can record data at a plurality of linear recording velocities or a continuously changing linear recording velocity and a recording waveform for modulating a recording beam includes a direct current section and a recording pulse section. Data are recorded so that the intensity Pbi of the direct current section and the intensity Pw of the recording pulse section satisfy PbiH/PbiL<1 and (PbiH/PwH)/(PbiL/PwL)<1 where PwL and PbiL are Pw and Pbi when data are to be recorded at a linear recording velocity $V_L$ and PwH and PbiH are Pw and Pbi when data are to be recorded at a linear recording velocity $V_H$ higher than the linear recording velocity $V_L$ and satisfying $1.1 \leq V_H/V_L$. As a result, it is possible to reduce jitter of a reproduced signal even in the case where data are recorded over a wide range of linear velocities.

63 Claims, 7 Drawing Sheets

FOREIGN PATENT DOCUMENTS

| | | |
|---|---|---|
| JP | 10-308027 | 11/1998 |
| JP | 11-232652 | 8/1999 |
| JP | 2000-155945 | 6/2000 |
| JP | 2000-322739 | 11/2000 |
| WO | 97/30440 A2 | 8/1997 |

* cited by examiner

OPTICAL RECORDING METHOD, OPTICAL RECORDER, AND OPTICAL RECORDING MEDIUM

BACKGROUND OF THE INVENTION

The present invention relates to an optical recording medium, a method for recording data in the same and an apparatus for recording data in the same and, particularly, to a phase change type optical recording medium, a method for recording data in the same and an apparatus for recording data in the same.

DESCRIPTION OF THE PRIOR ART

Recently, optical recording media in which data can be recorded with high density and from which recorded data can be erased have attracted attention. Among phase change type optical recording media data, the rewritable type optical recording media are recorded with data by projecting a laser beam onto a recording layer, thereby changing the crystalline state thereof, and data are reproduced by detecting change in the reflection coefficients of the recording layer due to the phase change. The phase change type optical recording medium has attracted attention because data recorded in the phase change type optical recording medium can be overwritten by modulating the power of a single laser beam and the optical system of a driving apparatus can be simplified in comparison with that for optical magnetic recording media.

In the phase change type optical recording medium in which data can be overwritten, an amorphous record mark is formed by irradiating a crystalline recording layer with a laser beam having a recording power level, melting it and quickly cooling the melted recording layer. When data are to be erased in the phase change type optical recording medium, the amorphous record mark is crystallized by irradiating the record mark, heating it to a temperature equal to or higher than the crystallizing temperature and lower than the melting point thereof, and gradually cooling it.

Illustrative examples of the practical optical recording media in which data can be overwritten include the CD-RW, DVD-RW and DVD-RAM. The CD-RW has the substantially same capacity of 640 MB as that of the CD-DA (compact disk). In the CD-RW, data are practically recorded at a linear velocity of four to ten times that of the CD-DA. On the other hand, in the DVD-RW and DVD-RAM, each having the same capacity of 4.7 GB as that of a DVD-ROM, data are usually recorded at 1× linear velocity (original linear velocity) and are not practically recorded at a linear velocity exceeding that double the original linear velocity. This is because the recording density of the DVD-RW and DVD-RAM is extremely high in comparison with that of the CD-RW and it is difficult to overwrite data over a wide range of linear velocities while maintaining jitter low. In the case of recording data at a higher density than that of the DVD (Digital Versatile Disk) system media, it is further difficult to overwrite data over a wide range of linear velocities while maintaining jitter low.

It is therefore an object of the present invention to provide an optical recording method for recording data in an optical recording medium, which can reduce jitter of a reproduced signal even in the case where data are recorded over a wide range of linear velocities.

Further, it is another object of the present invention to provided an optical recording apparatus for recording data in an optical recording medium, which can reduce jitter of a reproduced signal even in the case where data are recorded over a wide range of linear velocities.

Moreover, it is a further object of the present invention to provide an optical recording medium which can reduce jitter of a reproduced signal even in the case where data are recorded over a wide range of linear velocities.

DISCLOSURE OF THE PRESENT INVENTION

The above objects of the present invention can be accomplished by (1) to (24) below.

(1) An optical recording method for recording data in an optical recording medium having a recording layer containing a phase change material at a plurality of linear recording velocities or a continuously changing linear recording velocity using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, Pbi and Pw being set so as to satisfy PbiH/PbiL<1 and (PbiH/PwH)/(PbiL/PwL)<1 where PbiL and PwL are Pbi and Pw when data are to be recorded at a linear recording velocity $V_L$ selected from among the plurality of linear recording velocities or the continuously changing linear recording velocity and PbiH and PwH are Pbi and Pw when data are to be recorded at a linear recording velocity $V_H$ which satisfies $1.1 \leq V_H/V_L$.

(2) An optical recording method for recording data in an optical recording medium having a recording layer containing a phase change material at a linear recording velocity selected from among a plurality of linear recording velocities using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, Pbi and Pw being set so as to satisfy PhiH/PbiL<1 and (PbiH/PwH)/(PbiL/PwL)<1 where PbiL and PwL are Phi and Pw when data are to be recorded at a linear recording velocity $V_L$ and PbiH and PwH are Pbi and Pw when data are to be recorded at a linear recording velocity $V_H$ which satisfies $1.1 \leq V_H/V_L$.

(3) An optical recording method for recording data in an optical recording medium defined in (1) or (2), wherein the recording pulse section further includes a downward pulse having a width of Tcl and following the last upward pulse and TclL and TclH are set so as to satisfy TclH/TclL<1 where TclL is Tcl when data are to be recorded at the linear recording velocity $V_L$ and TclH is Tcl when data are to be recorded at the linear recording velocity $V_H$.

(4) An optical recording method for recording data in an optical recording medium defined in any one of (1) to (3), wherein the upward pulse between the first upward pulse and the last upward pulse has a width Tmp, and TmpL and TmpH are set so as to satisfy TmpH/TmpL≦1 where TmpL is Tmp when data are to be recorded at the linear recording velocity $V_L$ and TmpH is Tmp when data are to be recorded at the linear recording velocity $V_H$.

(5) An optical recording method for recording data in an optical recording medium defined in any one of (1) to (4), wherein the first upward pulse has a width of Ttop, and TtopL and TtopH are set so as to satisfy TtopH/TtopL≦1 where TtopL is Ttop when data are to be recorded at the linear recording velocity $V_L$ and TtopH is Ttop when data are to be recorded at the linear recording velocity $V_H$.

(6) An optical recording method for recording data in an optical recording medium defined in any one of (1) to (5), wherein the last upward pulse has a width of Tlp, and TlpL and TlpH are set so as to satisfy 1≦TlpH/TlpL where TlpL is Tlp when data are to be recorded at the linear recording velocity $V_L$ and TlpH is Tlp when data are to be recorded at the linear recording velocity $V_H$.

(7) An optical recording method for recording data in an optical recording medium defined in any one of (1) to (6), wherein the intensities of the pulses and the widths of the pulses used at the respective linear recording velocities $V_L$ and $V_H$ are determined by test recording.

(8) An optical recording method for recording data in an optical recording medium defined in any one of (1) to (6), wherein n·Tw≦20 ns is satisfied at a highest linear recording velocity where Tw is a width of a detection window and n·Tw is a signal length corresponding to a shortest record mark.

(9) An optical recording method for recording data in an optical recording medium having a recording layer containing a phase change material using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, a reference linear recording velocity and recommended values of Pw and Pbi when data are to be recorded at the reference linear recording velocity being given, and PbiL, which is Pbi when data are to be recorded at a linear recording velocity $V_L$, and PbiH, which is Pbi when data are to be recorded at a linear recording velocity $V_H$, being set so as to satisfy PbiH/PbiL<1 and (PbiH/PwH)/(PbiL/PwL)<1 where one of the linear recording velocity $V_L$ and the linear recording velocity $V_H$ is the reference linear recording velocity and the other thereof is a linear recording velocity used for test recording, the linear recording velocity $V_L$ and the linear recording velocity $V_H$ satisfy 1.1≦$V_H/V_L$, thereby determining Pw and Pbi used for the test recording or when data are to be recorded at a linear recording velocity region including the linear recording velocity for the test recording.

(10) An optical recording method for recording data in an optical recording medium defined in (9), wherein the recording pulse section further includes a downward pulse following the last upward pulse and having a width of Tcl, a recommended value of Tcl when data are to be recorded at the reference linear recording velocity is given, and Tcl for the test recording is set so as to satisfy TclH/TclL<1 where TclL is Tcl when data are to be recorded at the linear recording velocity $V_L$ and TclH is Tcl when data are to be recorded at the linear recording velocity $V_H$, thereby determining Tcl used for the test recording or when data are to be recorded at a linear recording velocity region including the linear recording velocity for the test recording.

(11) An optical recording method for recording data in an optical recording medium defined in (9) or (10), wherein the upward pulse between the first upward pulse and the last upward pulse has a width Tmp, a recommended value of Tmp at the reference linear recording velocity is given, and Tmp for the test recording is set so as to satisfy TmpH/TmpL≦1 where TmpL is Tmp when data are to be recorded at the linear recording velocity $V_L$ and TmpH is Tmp when data are to be recorded at the linear recording velocity $V_H$, thereby determining Tmp used for the test recording or when data are to be recorded at a linear recording velocity region including the linear recording velocity for the test recording.

(12) An optical recording method for recording data in an optical recording medium defined in any one of (9) to (11), wherein the first pulse has a width Ttop, a recommended value of Ttop at the reference linear recording velocity is given, and Ttop for the test recording is set so as to satisfy TtopH/TtopL≦1 where TtopL is Ttop when data are to be recorded at the linear recording velocity $V_L$ and TtopH is Ttop when data are to be recorded at the linear recording velocity $V_H$, thereby determining Ttop used for the test recording or when data are to be recorded at a linear recording velocity region including the linear recording velocity for the test recording.

(13) An optical recording method for recording data in an optical recording medium defined in any one of (9) to (12), wherein the last pulse has a width Tlp, a recommended value of Tlp at the reference linear recording velocity is given, and Tlp for the test recording is set so as to satisfy 1≦TlpH/TlpL where TlpL is Tlp when data are to be recorded at the linear recording velocity $V_L$ and TlpH is Tlp when data are to be recorded at the linear recording velocity $V_H$, thereby determining Tlp used for the test recording or when data are to be recorded at a linear recording velocity region including the linear recording velocity for the test recording.

(14) An optical recording method for recording data in an optical recording medium defined in any one of (9) to (13), wherein n·Tw≦20 ns is satisfied at a highest linear recording velocity where Tw is a width of a detection window and n·Tw is a signal length corresponding to a shortest record mark.

(15) An optical recording apparatus for recording data in an optical recording medium in accordance with the optical recording method defined in any one of (1) to (8), the optical recording apparatus being constituted so as to store pulse intensities and pulse widths used at the linear recording velocity $V_L$ and the linear recording velocity $V_H$.

(16) An optical recording apparatus for recording data in an optical recording medium in accordance with the optical recording method defined in any one of (1) to (8), the optical recording apparatus being constituted so as to store a plurality of pulse intensities and a plurality of pulse widths used at each of the linear recording velocity $V_L$ and the linear recording velocity $V_H$ and select a pulse intensity and a pulse width used for recording data in the optical recording medium from the plurality of pulse intensities and the plurality of pulse widths by test recording of data in the optical recording medium.

(17) An optical recording apparatus for recording data in an optical recording medium in accordance with the optical recording method defined in any one of (1) to (8), pulse intensities and pulse widths used at the linear recording velocity $V_L$ and the linear recording velocity $V_H$ being defined as functions of the linear recording velocity $V_L$ and the linear recording velocity $V_H$ and the optical recording apparatus being constituted so as to store the functions.

(18) An optical recording apparatus for recording data in an optical recording medium in accordance with the optical recording method defined in any one of (1) to (8), pulse intensities and pulse widths used at the linear recording velocity $V_L$ and the linear recording velocity $V_H$ being defined as functions of the linear recording velocity $V_L$ and the linear recording velocity $V_H$ and the optical recording apparatus being constituted so as to store a plurality of the functions for each of the linear recording velocity $V_L$ and the linear recording velocity $V_H$ and select functions used for recording data in the optical recording medium from the plurality of the functions by test recording of data in the optical recording medium.

(19) An optical recording apparatus for recording data in an optical recording medium in accordance with the optical recording method defined in any one of (9) to (14), the optical recording apparatus being constituted so as to store recommended values of the pulse intensity and the pulse width used at the reference linear recording velocity.

(20) An optical recording medium in which data are to be recorded in accordance with the optical recording method defined in any one of (1) to (8), the optical recording medium being constituted so as to store pulse intensities and pulse widths used at the linear recording velocity $V_L$ and the linear recording velocity $V_H$.

(21) An optical recording medium in which data are to be recorded in accordance with the optical recording method defined in any one of (1) to (8), the optical recording medium being constituted so as to store a plurality of pulse intensities and a plurality of pulse widths used at each of the linear recording velocity $V_L$ and the linear recording velocity $V_H$ and so that a pulse intensity and a pulse width used for recording data in the optical recording medium are selected from among the plurality of pulse intensities and the plurality of pulse widths by test recording of data in the optical recording medium.

(22) An optical recording medium in which data are to be recorded in accordance with the optical recording method defined in any one of (1) to (8), pulse intensities and pulse widths used at the linear recording velocity $V_L$ and the linear recording velocity $V_H$ being defined as functions of the linear recording velocity $V_L$ and the linear recording velocity $V_H$ and the optical recording medium being constituted so as to store the functions.

(23) An optical recording medium in which data are to be recorded in accordance with the optical recording method defined in any one of (1) to (8), pulse intensities and pulse widths used at the linear recording velocity $V_L$ and the linear recording velocity $V_H$ being defined as functions of the linear recording velocity $V_L$ and the linear recording velocity $V_H$ and the optical recording medium being constituted so as to store a plurality of the functions for each of the linear recording velocity $V_L$ and the linear recording velocity $V_H$ and so that functions used for recording data in the optical recording medium are selected from among the plurality of the functions by test recording of data in the optical recording medium.

(24) An optical recording medium in which data are to be recorded in accordance with the optical recording method defined in any one of (9) to (14), the optical recording medium being constituted so as to store recommended values of the pulse intensity and the pulse width at the reference linear recording velocity.

The above objects of the present invention can be also accomplished by an optical recording method for recording data in an optical recording medium having a recording layer containing a phase change material by irradiating it with a recording beam whose intensity is modulated between a plurality of power levels including at least a recording power and a bias power, a recording power PwL and a bias power PbiL when data are to be recorded at a first linear recording velocity and a recording power PwH and a bias power PbiH when data are to be recorded at a second linear recording velocity higher than the first linear recording velocity being set so as to satisfy PbiH/PbiL<1 and (PbiH/PwH)/(PbiL/PwL)<1.

According to the present invention, jitter of a reproduced signal can be reduced even when data are recorded at a wide range of linear recording velocities.

BRIEF DESCRIPTION OF THE DRAWINGS

FIG. 4 is a drawing showing a write strategy when data are to be recorded using the (1, 7) RLL modulation code wherein FIG. 4(a) is a drawing showing a write strategy for forming a 3T signal, FIG. 4(b) is a drawing showing a write strategy for forming a 4T signal, FIG. 4(c) is a drawing showing a write strategy for forming a 5T signal and FIG. 4(d) is a drawing showing a write strategy for forming a 5T signal to a 8T signal.

DESCRIPTION OF THE PREFERRED EMBODIMENTS

Hereinafter, a preferred embodiment of the present invention will be described in detail referring to the accompany drawings.

Data are recorded in an optical recording medium by irradiating the optical recording medium with a recording beam and forming a number of record marks, and the length between the starting point and the terminal point of an individual record mark and the length between the terminal point of the record mark and the starting point of a next recording mark constitute data. The length of each record mark and the length between neighboring record marks (edges) are determined to be a length corresponding to one among 3T to 11T and 14T where T is the cycle of a clock in the case where the EPM plus (8-16) modulation code, which is sometimes called the 8-16 modulation code, is employed and they are determined to be a length corresponding to one among 2T to 8T in the case where the (1, 7) RLL modulation code, which is sometimes called the 1-7 modulation code is employed.

When data are to be recorded in a phase change type optical recording medium, it is general to perform multi-pulse recording as set out in Japanese Patent Application Laid-Open Nos. 10-106008, 11-232652 and 2000-155945 without direct-currently projecting a recording beam correspondingly to the length of a record mark.

Figure 1:
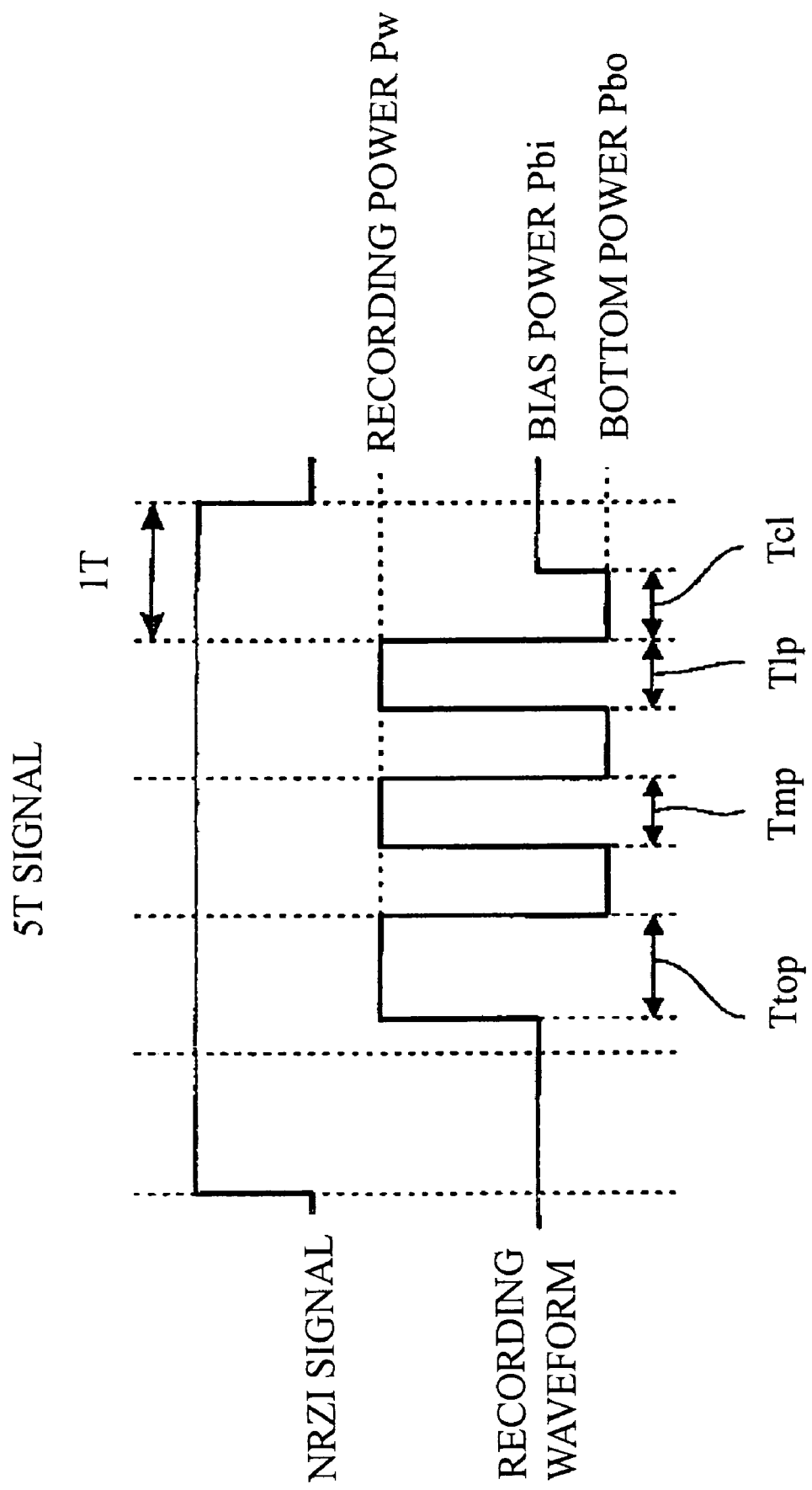
FIG. 1 is a graph showing a 5T signal and a recording waveform thereof.

FIG. 1 shows a recording waveform used for the multi-pulse recording. A recording waveform as termed in this specification means the pattern of a drive signal for modulating the power of a recording beam. A 5T signal of an NRZI signal in the case where the EPM plus (8-16) modulation code is employed and the recording waveform corresponding to the 5T signal are shown in FIG. 1.

In FIG. 1, the symbol Pw designates recording power, the symbol Pbi designates bias power and the symbol Pbo designates bottom power. Pbi is usually called the erasing power in a system capable of overwriting data. The recording waveform includes a recording pulse section for forming a record mark and a direct current section for erasing a record mark. The recording pulse section has a configuration of repeating an upward pulse having a recording power Pw and a following downward pulse having a bottom power Pbo, and the entire recording pulse section is raised from Pbi and returned to Pbi. Therefore, the neighboring recording pulse sections are connected via the direct current section.

In FIG. 1, the symbol Ttop designates the width of a first upward pulse and the symbol Tmp designates the width of an upward pulse between the first upward pulse and the last upward pulse, which is sometimes called a multi-pulse. The symbol Tlp designates the width of the last upward pulse and the symbol Tcl designates the width of a downward pulse added to the end of the last pulse, which is sometimes called a cooling pulse. These pulse widths are expressed as values normalized with a reference clock width (1T). In the recording waveform shown in FIG. 1, the power of all of the downward pulses including the cooling pulse, namely, the bottom power Pbo, are set to be lower than the bias power Pbi.

Figure 2:
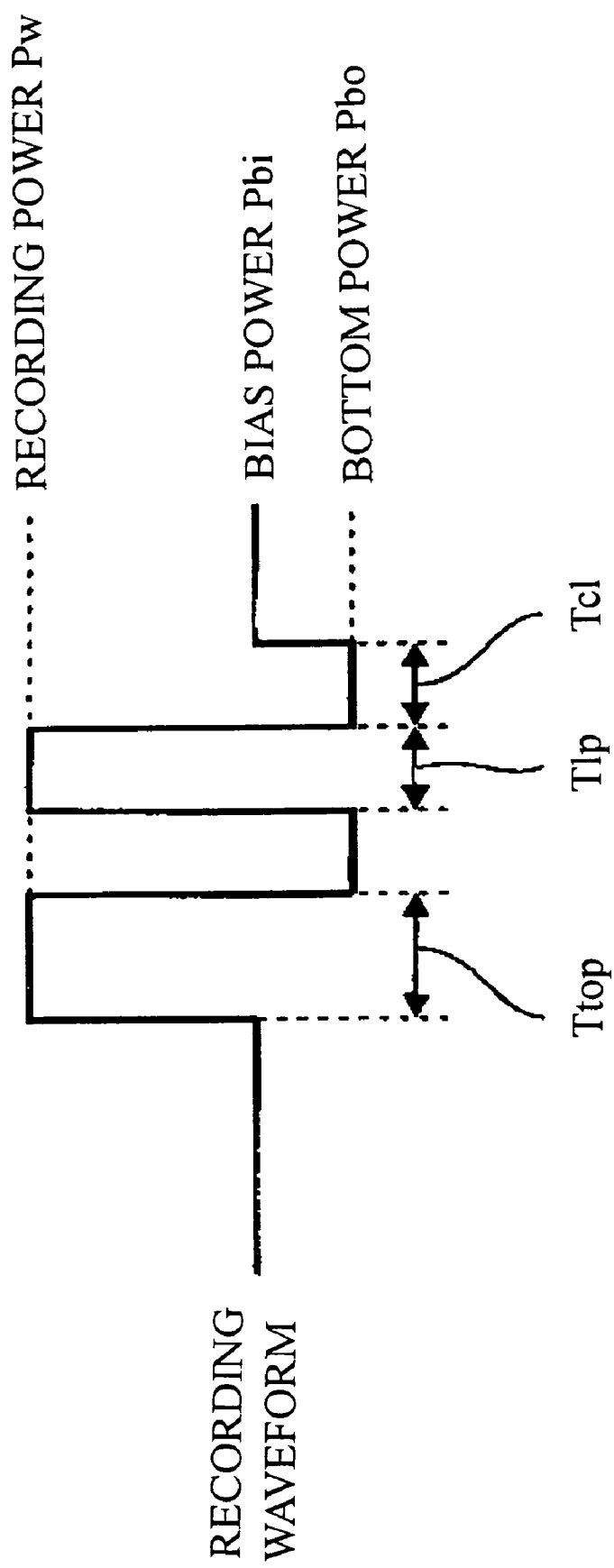
FIG. 2 is a graph showing a recording waveform of a 4T signal.

FIG. 2 shows a recording waveform of a 4T signal in the case where the EPM plus (8-16) modulation code is employed. A recording pulse section in the recording waveform is constituted by two upward pulses and downward pulses each following one of the upward pulses. In the recording pulse section, the width of a first upward pulse is designated Ttop and the width of the second upward pulse from the beginning is designated Tlp.

Figure 3:
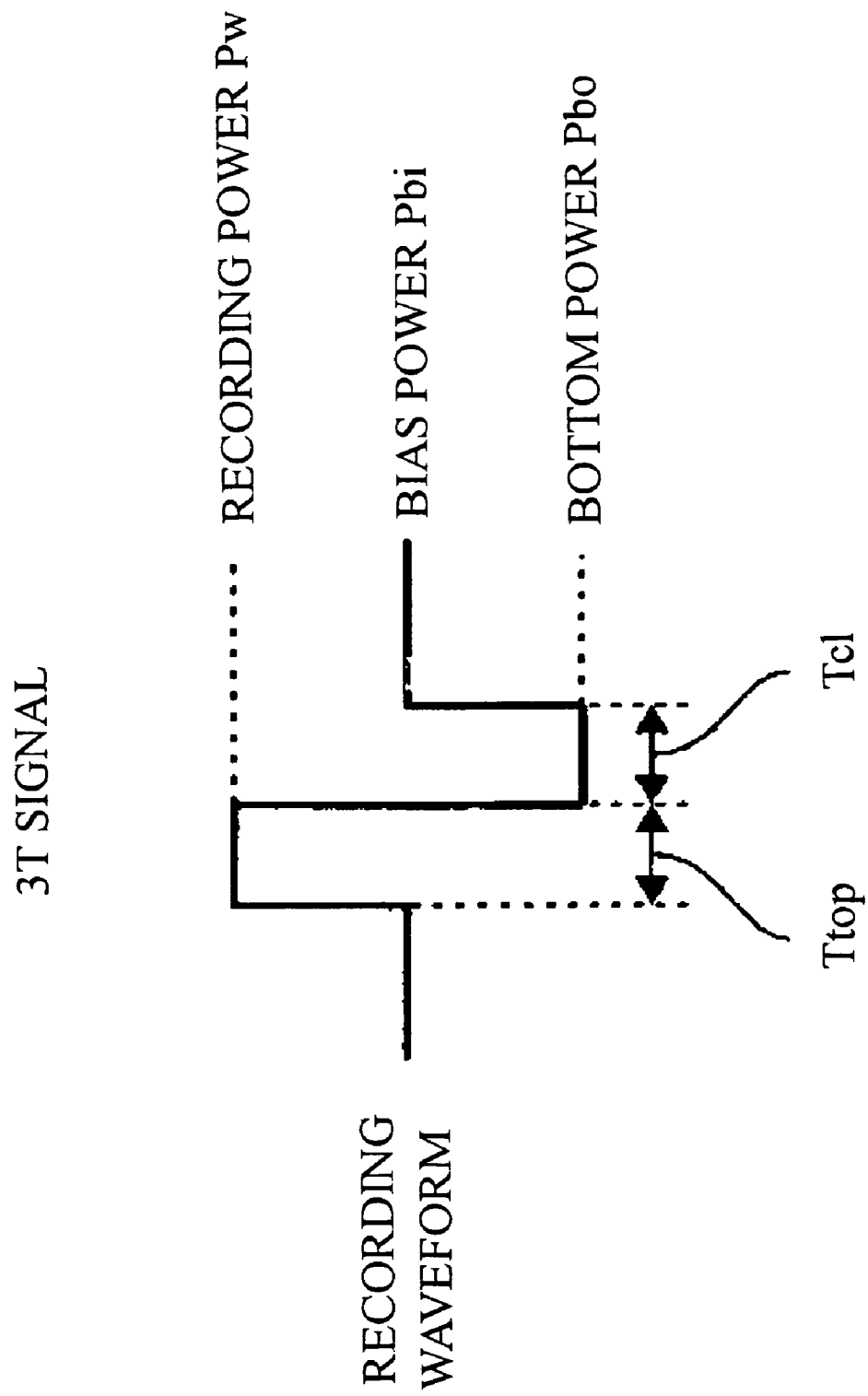
FIG. 3 is a graph showing a recording waveform of a 3T signal.

FIG. 3 shows a recording waveform of a 3T signal which is the shortest signal in the case where the EPM plus (8-16) modulation code is employed. A recording pulse section in the recording waveform is constituted by a single upward pulse and a single downward pulse. In the recording pulse section, the width of the upward pulse is designated Ttop.

In this manner, in the case where the EPM plus (8-16) modulation code is employed, the number of upward pulses is determined to be (k-2) where k is a multiple of T and assumes one among 3 to 11 and 14. Therefore, although not shown in Figures, in the case where a 6T to 11T or 14T signal is formed, the number of upward pulses is equal to 4 to 9 or 12. All upward pulses between the first upward pulse and the last upward pulse are multi-pulses and in the case where a 6T to 11T or 14T signal is formed, the number of the multi-pulses is equal to 2 to 7 or 10.

In this specification, each of the pulse widths is normalized with the reference clock width. In the case where the modulation code is not changed even if the linear recording velocity is changed, since the reference clock width is changed inversely to the linear recording velocity, the length of a recording mark of the same signal on the medium is constant irrespective of the linear recording velocity. Therefore, linear recording density, namely, the bit density, is constant irrespective of the linear recording velocity. For example, if the linear recording velocity is reduced to half, the reference pulse width is doubled. In this manner, data may be recorded in an optical recording medium at a plurality of linear recording velocities. The optical recording medium in which data can be recorded at a plurality of linear recording velocities is sometimes called a multi-speed type optical recording medium and data recording in the multi-speed type optical recording medium is sometimes called multi-speed recording.

When data are recorded in an optical recording medium using the CAV (constant angular velocity) format in which the rotational speed is kept constant, the linear recording velocity increases toward the outer circumference of the optical recording medium. Therefore, data are recorded in the optical recording medium at a continuously changing linear recording velocity.

In the present invention, in the case where data are to be recorded in a phase change optical recording medium at a plurality of linear recording velocities or a continuously changing linear recording velocity, the pulse intensity (power level) and the pulse width are controlled in accordance with a linear recording velocity in order to reduce jitter of signals reproduced from data recorded at all linear recording velocity regions in the following manner.

First, a linear recording velocity $V_L$ and a linear recording velocity $V_H$ which is higher than the linear recording velocity $V_L$ are selected from among the plurality of the linear recording velocities or the values of the continuously changing recording velocity. Preferably, the linear recording velocity $V_L$ and the linear recording velocity $V_H$ satisfy $1.1 \leq V_H/V_L$.

Further, in the present invention, in the recording waveform whose recording pulse section includes at least three upward pulses, data are to be recorded in an optical recording medium so as to satisfy PbiH/PbiL<1 and (PbiH/PwH)/(PbiL/PwL)<1 where the symbols PwL and PbiL are Pw and Pbi when data are to be recorded at the linear recording velocity $V_L$ and the symbols PwH and PbiH are Pw and Pbi when data are be recorded at the linear recording velocity $V_H$.

As a result, in the case where data are recorded at high density, jitter can be reduced even if data are recorded at either of the linear recording velocities $V_L$ and $V_H$. Namely, in the case where the multi-speed recording is performed or where data are recorded using the CAV format, linear recording jitter can be reduced when data are recorded at any linear recording velocity. This effect becomes more pronounced as the ratio of $V_H$ to $V_L$ increases.

Further, it is preferable to set the value PbiH/PbiL to be smaller and the value (PbiH/PwH)/(PboL/PwL) to be smaller, as the value $V_H/V_L$ increases.

If PwL, PbiL, PwH and PbiH satisfy (PbiH/PwH)/(PbiL/PwL)<1, they naturally satisfy PbiL/PwL>PbiH/PwH and therefore, they satisfy PwH/PwL>PbiH/PbiL. Namely, in the present invention, although Pbi is decreased as the linear recording velocity increases, Pw may be increased, decreased or made constant as the linear recording velocity increases. However, if Pw is decreased as the linear recording velocity increases, the reduction ratio of Pw is set to be higher than that of Pbi, whereby jitter can be suppressed within a tolerance over a wide range of linear recording velocities.

Jitter can be reduced because re-crystallization of the phase change material is suppressed by setting pulse intensity in this manner and re-crystallization of the recording layer can be suppressed because the influence of thermal interference is lowered by setting pulse intensity in this manner. Although the influence of thermal interference becomes great as the linear recording velocity is increased, if pulse intensity is set in the above described manner, the amount of heat applied to the recording layer when data are recorded at the recording velocity is suppressed, thereby suppressing re-crystallization of the recording layer.

Further, in the present invention, it is preferable to record data in an optical recording medium so as to satisfy TclH/TclL<1 where TclL is Tcl when data are to be recorded at the linear recording velocity $V_L$ and TclH is Tcl when data are to be recorded at the linear recording velocity $V_H$. As a result, it is possible to prevent jitter from increasing due to change in the linear recording velocity over a wide range of linear recording velocities.

Furthermore, in the present invention, it is preferable to record data in an optical recording medium so as to satisfy TmpH/TmpL≦1 where TmpL is Tmp when data are to be recorded at the linear recording velocity $V_L$ and TmpH is Tmp when data are to be recorded at the linear recording velocity $V_H$. As a result, it is possible to further prevent jitter from increasing due to change in the linear recording velocity over a wide range of linear recording velocities.

Moreover, in the present invention, it is preferable to record data in an optical recording medium so as to satisfy TtopH/TtopL≦1 where TtopL is Ttop when data are to be recorded at the linear recording velocity $V_L$ and TtopH is Ttop when data are to be recorded at the linear recording velocity $V_H$. As a result, it is possible to further prevent jitter from increasing due to change in the linear recording velocity over a wide range of linear recording velocities.

Further, in the present invention, it is preferable to record data in an optical recording medium so as to satisfy 1≦TlpH/TlpL, preferably, 1<TlpH/TlpL, where TlpL is Tlp when data are to be recorded at the linear recording velocity $V_L$ and TlpH is Tlp when data are to be recorded at the linear recording velocity $V_H$. As a result, it is possible to further prevent jitter from increasing due to change in the linear recording velocity over a wide range of linear recording velocities.

In the case of setting pulse widths so as to satisfy TmpH/TmpL≦1 and/or TtopH/TtopL≦1, since thermal interference can be reduced and re-crystallization of the recording layer can be suppressed similarly to the case of setting pulse widths so as to satisfy PbiH/PbiL<1 and (PbiH/PwH)/(PbiL/PwL)<1, jitter can be further prevented from increasing.

On the other hand, in the case of setting pulse widths so as to satisfy TclH/TclL<1 and/or 1≦TlpH/TlpL, since the efficiency for erasing an existing record mark can be increased, jitter can be further prevented from increasing. More specifically, since the setting of Tcl and Tlp influences the crystallization of the rear edge region of the record mark and a region following it (a region between neighboring record marks), in the case where a record mark is already formed in this region, namely, in the case where this region is in an amorphous phase, the record mark cannot be erased (crystallized) in a desired manner due to the shortage of heat. Since this tendency becomes pronounced as the linear recording velocity is increased, it is possible to improve the efficiency for erasing an existing record mark and further prevent jitter from increasing by setting pulse widths so as to satisfy TclH/TclL<1 and/or 1≦TlpH/TlpL.

The pulse intensities and the pulse widths used with the respective linear recording velocities $V_L$ and $V_H$ are determined so that PbiH/PbiL, (PbiH/PwH)/(PbiL/PwL), TmpH/TmpL, TclH/TclL, TtopH/TtopL and TlpH/TlpL are within ranges prescribed by the present invention. Information for setting the pulse intensities and the pulse widths used with the respective linear recording velocities $V_L$ and $V_H$ may be stored in an optical recording apparatus or recorded in an optical recording medium. Specifically, these values may be tabulated to be stored in a storing means in the optical recording apparatus or to be recorded in advance in the optical recording medium. Further, instead tabulating these values, it is possible, for example, to define pulse intensities and pulse widths used with the respective recording velocities as functions of the linear recording velocity and store the functions in the storing means or record them in the optical recording medium. Such information is sometimes referred to as "information for setting recording conditions".

The present invention is required to enable recording of data at a plurality of linear recording velocities, namely, of performing multi-speed recording of data in a CLV (Constant Linear Velocity) format, and the present invention is effective in the case where the plurality of linear recording velocities are greatly different from each other. In this case, the plurality of linear recording velocities are usually defined as an original linear velocity (3.49 m/s in the DVD-RAM) and integer multiples thereof, but it is not absolutely necessary for them to include integer multiples of the original linear velocity. It further is not absolutely necessary for them to include the original linear velocity and the present invention may be applied to a high speed data recording system in which data can be recorded at only a linear recording velocity equal to or more than twice the original linear velocity or a linear recording velocity equal to or more than four times the original linear velocity.

Thus, one of the features of the present invention lies in that the relationship between recording conditions at different linear recording velocities is determined in a data recording system in which data can be recorded in the CLV format and at a plurality of linear recording velocities. Therefore, the present invention includes a case where data are to be recorded on one optical recording medium belonging to such a data recording system at a certain linear recording velocity selected from among the plurality of linear recording velocities.

Another feature of the present invention lies in that the relationship between recording conditions at each of linear recording velocities among a continuously changing linear velocity are determined in a data recording system in which data are to be recorded in the CAV (Constant Angular Velocity). Since data are recorded in a disk-like optical recording medium rotating at a constant rotational speed in the CAV format, data are recorded in the optical recording medium at a continuously changing linear velocity and, therefore, the linear velocity at the outer circumferential portion of the optical recording medium is higher than that at the inner circumferential portion.

In this specification, the CLV format includes the MCLV (Modified CLV) format and the CAV format includes the MCAV (Modified CAV) format. The MCLV format and the MCAV format are referred to in, for example, "Optical Disk Technology," page 233, published by Radio Technology Co. Ltd. on Feb. 10, 1989.

In the present invention, even in the case where the linear recording velocity increases or decreases continuously, it is not necessary to continuously control the pulse intensities and the pulse widths. For example, in the case of recording data in the CAV format, although the linear recording velocity continuously changes, it is not necessary to continuously change the pulse intensities and the pulse widths so as to correspond to the continuous change in the linear recording velocity, and several combinations of the pulse intensities and the pulse widths may be used. Specifically, it is possible to divide the linear recording velocity between the lowest linear recording velocity and the highest linear recording velocity of the CAV format into a plurality of linear recording velocity regions and set one combination of the pulse intensities and the pulse widths for each of the thus divided linear recording velocity regions.

In the case where data are to be recorded in a disk-like optical recording medium in the CAV format, the ratio of the linear recording velocity at the most inner circumferential portion thereof to that at the most outer circumferential portion thereof is generally 2 to 3 and usually 2.5. In this case, the number of combinations of the pulse intensities and the pulse widths to be determined is preferably equal to or larger than 2 and more preferably equal to or larger than 3. If the number of the combinations is too few, the advantage of the present invention becomes slight. On the other hand, since the effect of decreasing jitter is not markedly increased even if the number of the combinations is increased, it is unnecessary for the number of combinations to exceed 40. It is, however, possible to continuously change the pulse intensities and the pulse widths correspondingly to the change in the linear recording velocity.

On the other hand, in the case where data are to be recorded in the CLV format, since the linear recording velocity is usually changed to be an integer multiple of the original linear velocity such as 2× velocity, a 4× velocity, a 6× velocity, an 8× velocity or the like and $V_H/V_L$ is relatively large, it is preferable to change the pulse intensities and the pulse widths for every linear recording velocity.

The linear recording velocity $V_H$ is selected so as to satisfy preferably $1.1 \leq V_H/V_L$ and more preferably $1.2 \leq V_H/V_L$. If $V_H/V_L$ is small, it is unnecessary for the pulse intensities and the pulse widths to be set different between the linear recording velocities $V_L$ and $V_H$. On the other hand, if $V_H/V_L$ is too large, since the advantage of the present invention is slight, the linear recording velocities $V_L$ and $V_H$ are determined so as to satisfy preferably $V_H/V_L \leq 8$ and more preferably $V_H/V_L \leq 4$.

Next, the write strategies applicable to the present invention will be described in detail below with reference to the accompanying drawings.

Figure 4:
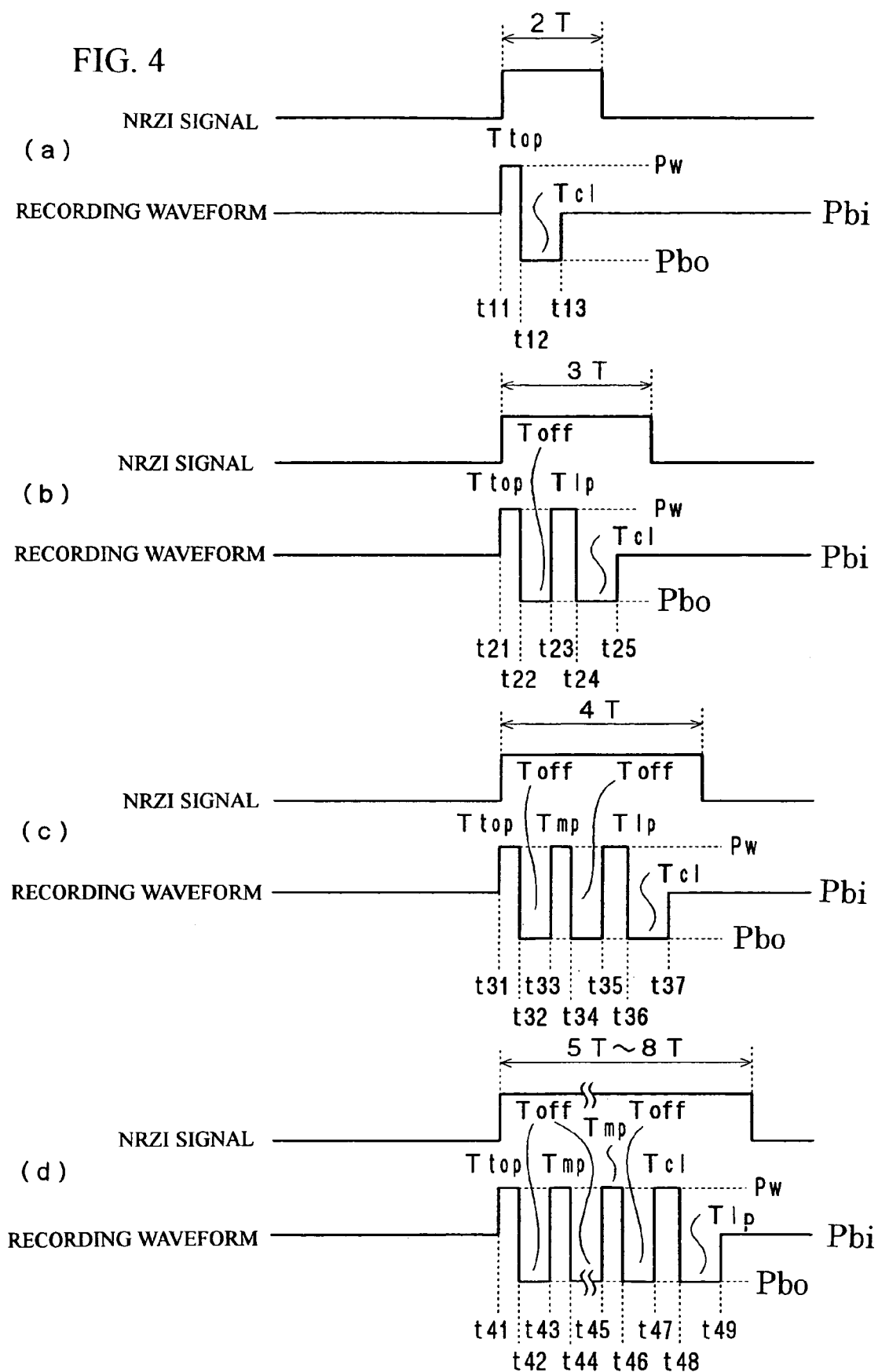

FIG. 4 is a drawing showing the write strategy when data are to be recorded in an optical recording medium using the (1, 7) RLL modulation code, wherein FIG. 4(a) is a drawing showing the write strategy for forming a 3T signal, FIG. 4(b) is a drawing showing the write strategy for forming a 4T signal, FIG. 4(c) is a drawing showing the write strategy for forming a 5T signal and FIG. 4(d) is a drawing showing the write strategy for forming a 5T signal to a 8T signal.

As shown in FIGS. 4(a) to 4(d), in this embodiment, when data are to be recorded in an optical recording medium, the power of a recording beam is modulated among three intensities (three values): the recording power Pw, the bias power Pbi and the bottom power Pbo. The intensity of the recording power Pw is set to be a level at which a phase change material contained in the recording layer can be melted by the irradiation with the recording beam so that the intensity of the recording power Pw is set to be PwH when data are to be recorded at the linear recording velocity $V_H$ and that it is set to be PwL when data are to be recorded at the $V_L$. The intensity of the bias power Pbi is set to be a level at which the phase change material contained in the recording layer can be heated to a temperature equal to or higher than the crystallization temperature thereof by the irradiation with the recording beam so that the intensity of the bias power Pbi is set to be PbiH when data are to be recorded at the linear recording velocity $V_H$ and that it is set to be PbiL when data are to be recorded at the $V_L$. The intensity of the bottom power Pbo is set to be a level at which the melted phase change material can be cooled even if it is irradiated with the recording beam so that the intensity of the bottom power Pbo is set to be PboH when data are to be recorded at the linear recording velocity $V_H$ and that it is set to be PboL when data are to be recorded at the linear recording velocity $V_L$.

As described above, the values of the recording power PwH and PwL and the bias power PbiH and PbiL are set so as to satisfy PbiH/PbiL<1 and (PbiH/PwH)/(PbiL/PwL)<1.

In the description regarding FIG. 4, when data are to be recorded at the linear recording velocity $V_H$, the recording power PwH, the bias power PbiH and the bottom power PboH will be merely referred to as the recording power Pw, the bias power Pbi and the bottom power Pbo, respectively, and when data are to be recorded at the linear recording velocity $V_L$, the recording power PwL, the bias power PbiL and the bottom power PboL will be merely referred to as the recording power Pw, the bias power Pbi and the bottom power Pbo, respectively.

Further, in the description regarding FIG. 4, when data are to be recorded at the linear recording velocity $V_H$, TtopH, TmpH, TlpH and TclH will be merely referred to as Ttop, Tmp, Tlp and Tcl, respectively, and when data are to be recorded at the linear recording velocity $V_L$, TtopL, TmpL, TlpL and TclL will be merely referred to as Ttop, Tmp, Tlp and Tcl, respectively.

As shown in FIG. 4(a), when a 2T signal is to be formed in an optical recording medium, the number of upward pulses is set to be "1" and a cooling pulse is added after the upward pulse. The number of upward pulses is defined as the number of times the intensity of the recording beam is raised to the recording power Pw. In this specification, among upward pulses of the recording beam, the first pulse is called a top pulse, the last pulse is called a last pulse and pulses between the top pulse and the last pulse are called multi-pulses. In the case where the number of upward pulses is "1", the top pulse corresponds to a multi-pulse.

Therefore, when a 2T signal is to be formed, the intensity of the recording beam is set to be the bias power Pbi before time t11, the recording power Pw during a period (Ttop) from the time t11 to the time t12, the bottom power Pbo during a period (Tcl) from the time t12 to the time t13, and the bias power Pbi after the time t13.

Further, as shown in FIG. 4(b), when a 3T signal is to be formed in an optical recording medium, the number of upward pulses is set to be "2" and a cooling pulse is added after the upward pulses. As shown in FIG. 4(b), in the case where the number of upward pulses is "2", the upward pulses are constituted as the top pulse and the last pulse.

Therefore, when a 3T signal is to be formed, the intensity of the recording beam is set to be the bias power Pbi before the time t21, the recording power Pw during a period (Ttop) from the time t21 to the time t22 and a period (Tlp) from the time t23 to the time t24, the bottom power Pbo during a period (Toff) from the time t22 to the time t23 and a period (Tcl) from the time t24 to the time t25, and the bias power Pbi after the time t25.

Furthermore, as shown in FIG. 4(c), when a 4T signal is to be formed in an optical recording medium, the number of upward pulses is set to be "3" and a cooling pulse is added after the upward pulses. Therefore, when a 4T signal is to be formed, the intensity of the recording beam is set to be the bias power Pbi before the time t31, the recording power Pw during a period (Ttop) from the time t31 to the time t32, a period (Tmp) from the time t33 to the time t34 and a period (Tlp) from the time t35 to the time t36, the bottom power Pbo during a period (Toff) from the time t32 to the time t33, a period (Toff) from the time t34 to the time t35 and a period (Tcl) from the time t36 to the time t37, and the bias power Pbi after the time t37.

Moreover, when a 5T signal to a 8T signal are to be formed in an optical recording medium, the number of upward pulses is set to be "3" and a cooling pulse is added after the upward pulses. Therefore, when a 5T signal to a 8T signal are to be formed in an optical recording medium, the number of multi-pulses is set to be "5" to "8", respectively. In this case, the intensity of the recording beam is set to be the recording power Pw during a period (Ttop) from the time t41 to the time t42, periods (Tmp) from the time t43 to the time t44, from the time t45 to the time t46 and the like, and a period (Tlp) from the time t47 to the time t48, the bottom power Pbo during periods (Toff) from the time t42 to the time t43, from the time t46 to the time t47 and the like, a period (Toff) from the time t46 to the time t47 and a period (Tcl) from the time t48 to the time t49, and the bias power Pbi during other periods.

Thus, at a region where a recording signal, namely, a 2T signal to a 8T signal, is to be formed, a phase change material is melted by the irradiation with the recording beam having the recording power Pw and quickly cooled by the cooling pulse, thereby becoming an amorphous phase. On the other hand, at other regions, the phase change material is heated to a temperature equal to or higher than the crystallization temperature thereof by the radiation with the recording beam having the bias power Pbi and gradually cooled by moving the recording beam away, thereby being crystallized.

In the present invention, in the case of $V_H > V_L$, preferably, $1.1 \leq V_H/V_L$, jitter of reproduced signal from data recorded at a wide range of linear recording velocities can be reduced by setting the pulse intensities (power levels) in the above write strategy so as to satisfy PbiH/PbiL<1 and (PbiH/PwH)/(PbiL/PwL)<1 and set the pulse widths so as to satisfy TclH/TclL<1, TmpH/TmpL$\leq$1, TtopH/TtopL$\leq$1 and $1 \leq$TlpH/TlpL.

The present invention can be applied to a recording method in which the pulse intensities and the pulse widths used for actual recording are determined by performing test recording at a particular linear recording velocity prior to recording data at the linear recording velocity in the CLV format. Further, the present invention can be applied to a recording method in which the pulse intensities and the pulse widths used for actual recording are determined by performing test recording using at least one linear recording velocity prior to recording data in the CAV format.

When test recording is to be performed, at least one parameter is selected from among parameters regarding pulse intensity and parameter regarding pulse width and test recording is performed on an optical recording medium by changing the value thereof. Then, a signal recorded by test recording is reproduced and error and jitter are measured, thereby judging the quality of the reproduced signal. When the quality of the reproduced signal is low, the parameter is changed and/or another parameter is changed and test recording is again performed. Optimum recording conditions used for actual recording are obtained by repeating these procedures. Since data are usually recorded in a disk-like optical recording medium from the inner circumferential portion, test recording is preferably performed at the inner circumferential portion and, more preferably performed at both the inner circumferential portion and the outer circumferential portion. In particular, in the CAV format, since a linear velocity at the inner circumferential portion is greatly different from that at the outer circumferential portion, it is preferable to perform test recording at both the inner circumferential portion and the outer circumferential portion. Test recording is usually performed in a test recording region provided separately from data recording regions.

Hereinafter, explanation will be made as to a case where the present invention is applied to a recording method constituted so as to determine optimum recording conditions by test recording.

In a first method using test recording, a plurality of pulse intensities and pulse widths are given for each of linear recording velocities $V_L$ and $V_H$. When data are to be recorded at a particular linear recording velocity, test recording is utilized for selecting the pulse intensity and the pulse width used for actual recording from among the plurality of pulse intensities and pulse widths assigned to the linear recording velocity. Further, in the first method, the pulse intensity and the pulse width used for actual recording at each linear recording velocity may be defined as a function of the linear recording velocity so that a plurality of the functions are provided for each linear recording velocity. In this case, the functions actually used at each linear recording velocity are determined by test recording. The plurality of combinations of the pulse intensity and the pulse width or the functions provided for each linear recording velocity may be stored in an optical recording apparatus or recorded in an optical recording medium. In this specification, the thus provided plurality of combinations of the pulse intensity and the pulse width or the functions are sometimes called "information for setting recording conditions".

Next, a second method using test recording will be explained. In the second method, a reference linear recording velocity has to be given and recommended values of pulse intensity and pulse width at the linear recording velocity have to be given. It is assumed that the reference linear recording velocity is $V_L$ and a linear recording velocity used for test recording is $V_H$. The linear recording velocity $V_H$ is a linear recording velocity used for actual recording in the CLV format. On the other hand, in the CAV format, as described above, the trial linear recording velocity $V_H$ is determined by dividing the linear recording velocity between the lowest linear recording velocity and the highest linear recording velocity into a plurality of linear recording velocity regions and selecting a linear recording velocity in the vicinity of the center of each linear recording velocity region. Similarly to the relationship between $V_L$ and $V_H$, the trial linear recording velocity $V_H$ satisfies $V_H > V_L$, preferably, $1.1 \leq V_H/V_L$. It is possible to obtain optimum recording conditions at the recording velocity $V_H$ higher than the reference linear recording velocity $V_L$ and that close to the recording velocity $V_H$ with a few procedures by setting PwH and PbiH so as to satisfy PbiH/PbiL<1 and (PbiH/PwH)/(PbiL/PwL)<1 where PwL and PbiL are recommended values of Pw and Pbi at the linear recording velocity $V_L$ and PwH and PbiH are Pw and Pbi when the test recording is performed at the linear recording velocity $V_H$ and performing the test recording.

The optimum value of each of Tcl, Tmp, Ttop and Tlp can be obtained in a similar manner. Specifically, when TclL is given as the recommended value of Tcl at the reference linear recording velocity $V_L$, if the test recording is performed by setting TclH so as to satisfy TclH/TclL<1 where TclH is Tcl when the test recording is performed at the linear recording velocity $V_H$, it is possible to obtain the optimum value of Tcl at the recording velocity $V_H$ and that close to the recording velocity $V_H$ with a few procedures.

Further, when TmpL is given as the recommended value of Tmp at the reference linear recording velocity $V_L$, if the test recording is performed by setting TmpH so as to satisfy TmpH/TmpL≦1 where TmpH is Tmp when the test recording is performed at the linear recording velocity $V_H$, it is possible to obtain the optimum value of Tmp at the recording velocity $V_H$ and that close to the recording velocity $V_H$ with a few procedures.

Furthermore, when TtopL is given as the recommended value of Ttop at the reference linear recording velocity $V_L$, if the test recording is performed by setting TtopH so as to satisfy TtopH/TtopL≦1 where TtopH is Ttop when the test recording is performed at the linear recording velocity $V_H$, it is possible to obtain the optimum value of Ttop at the recording velocity $V_H$ and that close to the recording velocity $V_H$ with a few procedures.

Moreover, when TlpL is given as the recommended value of Tlp at the reference linear recording velocity $V_L$, if the test recording is performed by setting TlpH so as to satisfy TlpH/TlpL≦1 where TlpH is Tlp when the test recording is performed at the linear recording velocity $V_H$, it is possible to obtain the optimum value of Tlp at the recording velocity $V_H$ and that close to the recording velocity $V_H$ with a few procedures.

The present invention can be also applied to the test recording when data are to be recorded at a linear recording velocity lower than the reference linear recording velocity. In this case, a reference linear recording velocity $V_H$ and a linear recording velocity $V_L$ used for the test recording are first set so as to satisfy $1.1 \leq V_H/V_L$. Further, PwL and PbiL are set so as to satisfy PbiH/PbiL<1 and (PbiH/PwH)/(PbiL/PwL)<1 where the symbols PwH and PbiH are recommended values of Pw and Pbi at the linear recording velocity $V_H$ and the symbols PwL and PbiL are Pw and Pbi when the test recording is to be performed at the linear recording velocity $V_L$, and the test recording is performed. As a result, it is possible to obtain optimum recording conditions at the recording velocity $V_L$ lower than the reference linear recording velocity $V_H$ and that close to the recording velocity $V_L$ with a few procedures. Each of the optimum values of Tcl, Tmp, Ttop and Tlp can be obtained in a similar manner.

It is sufficient for the optical recording apparatus to read the reference linear recording velocity and the recommended values of the pulse intensity and the pulse width when test recording is to be performed, and both may be stored in the optical recording apparatus or recorded in the optical recording medium. In this specification, the recommended values of the pulse intensity and the pulse width mean values recommended by an optical recording medium manufacturer, or optimum values or recommended values prescribed in the standard of the recording system. In this specification, these recommended values are sometimes called "information for setting recording conditions".

The reference linear recording velocity used in the above described method is not necessarily equal to the original linear recording velocity in a recording system to which the present invention is applied and may assume an arbitrary value. For example, in the case where the original linear recording velocity is 3.5 m/s, the reference linear recording velocity may be 2× velocity, namely, 7.0 m/s. Further, in the case where this recording method is applied, it is not necessary to record data at a plurality of linear recording velocities, and data may be recorded only at, for example, four times the velocity of the reference linear recording velocity.

The second method utilizing test recording is as described in the foregoing.

The present invention is most effective at a linear recording velocity range where $V_H/V_L$ is within the above range and the minimum value of the plurality of linear recording velocities or the changing linear recording velocity is preferably equal to or larger than 2 m/s, more preferably equal to or larger than 2.5 m/s, most preferably equal to or larger than 3 m/s.

When $V_H/V_L$ is within the above range, it is preferable that 0.2≦PbiH/PbiL<1, 0.5≦(PbiH/PwH)/(PbiL/PwL)<1, 0≦TclH/TclL<1, 0.2≦TmpH/TmpL≦1, 0.2≦TtopH/TtopL≦1 and 1≦TlpH/TlpL≦3 are satisfied and it is more preferable that 0.3≦PbiH/PbiL<0.99, 0.5≦(PbiH/PwH)/(PbiL/PwL)<0.99, 0.05≦TclH/TclL<0.99, 0.3≦TmpH/TmpL≦0.99, 0.3≦TtopH/TtopL≦0.99 and 1.01≦TlpH/TlpL≦3 are satisfied. If the ratio of pulse intensities or a ratio of pulse width is outside of the above range, it is difficult to reduce jitter when data are recorded at a linear recording velocity within a range where $V_H/V_L$ is within the above range. For example, when PbiH and PbiL are set so as to satisfy PbiH/PbiL<0.2, the efficiency of erasing data at the linear recording velocity $V_H$ is lowered and direct overwriting of data cannot be effected.

In the present invention, it is preferable in the recording waveform shown in FIGS. 2 and 4(b) and having two upward pulses in the recording pulse section and in the recording waveform shown in FIGS. 3 and 4(a) and having only one upward pulse in the recording pulse section that PbiH/PbiL, (PbiH/PwH)/(PbiL/PwL), Tcl and TtopH/TtopL lie within the above stated ranges and it is preferable in the recording waveform shown in FIGS. 2 and 4(b) that TlpH/TlpL also lies within the above stated range.

Since the first upward pulse is raised from the bias power Pbi, if the width Ttop of the first upward pulse is smaller that the width Tmp of the other pulse, the temperature of the recording layer is not sufficiently increased and it is sometimes difficult to form a record mark having a predetermined length. Therefore, it is preferable to set the width Ttop of the first upward pulse to smaller that the width Tmp of the other pulse so as to satisfy 1≦Ttop/Tmp. However, if Ttop/Tmp is too large, since the advantage of the multi-pulse recording is lowered, it is preferable to set the width Ttop of the first upward pulse to smaller that the width Tmp of the other pulse so as to satisfy Ttop/Tmp≦3.

Further, the length of a record mark can be adjusted by controlling the width Tlp of the last upward pulse. However, since the advantage of the multi-pulse recording is lowered if Tlp/Tmp is too small or too large, it is usually preferable to set Tlp so as to satisfy 0.5≦Tlp/Tmp≦2.

In the present invention, it is preferable to record data by setting the intensity Pbo of a downward pulse following the upward pulse in the recording pulse section so as to satisfy Pbo≦Pbi. This is because the advantage of proving the downward pulse is prevented from being lowered. However, the power level of the downward pulse has to be larger than 0 in order to enable the tracking servo operation. If Pbo is set to be equal to Pbi, the burden on the control means of the optical recording apparatus can be reduced. When the level Pbo of all downward pulses is the same and Pbo is equal to Pbi, the cooling pulse does not exist. However, the cooling pulse may be controlled separately from other downward pulses. In the present invention, it is preferable to provide a cooling pulse, since jitter can be reduced by controlling the cooling pulse in accordance with the linear recording velocity.

The intensity of the first upward pulse and that of the last upward pulse may be different from the intensity Pw of an upward pulse(s) therebetween. In the case of expressing the intensity of the first upward pulse as Ptop and the intensity of the last upward pulse as Plp, Ptop may be set to be higher than Plp instead of setting Ttop to be higher than Tmp, and Plp may be set to be higher or lower than Pw instead of setting Tlp to be higher or lower than Tmp. Further, Ttop and Ptop may be controlled together and Tlp and Plp may be controlled together. However, it is preferable to set Ptop equal to PW and Plp equal to Pw in order to reduce the burden on the control means of the optical recording apparatus.

The present invention is applied to a data rewritable type system. Therefore, since Pbi functions as an erasing power, the lower limit of Pbi can be determined based on the composition of the recording layer so as to crystallize a record mark, and the overwriting linear velocity and the like and the upper limit of Pbi can be determined so as to prevent the recording layer from changing to an amorphous state and prevent the recording layer from being damaged by repeating irradiation with a recording beam.

In the present invention, it is not absolutely necessary to always set Ttop to be equal to Tlp for forming record marks having the same signal length. For example, Ttop may be properly controlled for forming each record mark in accordance with the length of the record mark formed immediately before and Tlp may be properly controlled for forming each record mark in accordance with the length of the record mark to be formed immediately after.

The above mentioned Japanese Patent Application Laid Open No. 10-106008, Japanese Patent Application Laid Open No. 11-232652 and Japanese Patent Application Laid Open No. 2000-155945 disclose that the pulse width and the pulse height are controlled in accordance with the linear recording velocity in the multi-pulse recording. However, Japanese Patent Application Laid Open No. 10-106008 and Japanese Patent Application Laid Open No. 11-232652 do not disclose that Pbi and the ratio between Pbi and Pw are controlled in accordance with the linear recording velocity. Further, unlike the present invention, Japanese Patent Application Laid Open No. 2000-155945 specifies PbiL/PwL <PbiH/PwH.

Japanese Patent Application Laid Open No. 2000-155945 is directed to a CD-RW whose recording track pitch is wider than a DVD and experiments conducted regarding the CD-RW are described therein. To the contrary, as described later, the present invention is directed to an optical recording medium in which data can be recorded at higher density than that in the CD-RW. Further, the present invention is directed to an optical recording medium whose recording track pitch is equal to or narrower than that of the DVD-RW, namely, 0.74 µm. As a result, it can be considered that the relationship between PbiL/PwL and PbiH/PwH is reverse to that described in Japanese Patent Application Laid Open No. 2000-155945. Moreover, it is effective to apply the present invention to an optical recording medium whose recording track pitch is equal to or narrower than 0.8 µm. However, since the present invention is not so advantageous when applied to an optical recording medium whose recording track pitch is too narrow, it is preferable to apply the present invention to an optical recording medium whose recording track pitch is equal to or wider than 0.1 µm.

The present invention is particularly advantageous when data are recorded so as to satisfy n·Tw≦20 ns, particularly, n·Tw≦18 ns at the highest linear recording velocity where Tw is the width of a detection window and n·Tw is the signal length corresponding to the shortest record mark. In other words, the present invention is particularly advantageous when the signal length n·Tw corresponding to the shortest record mark is equal to or longer than a certain value.

The shortest signal length n·Tw affects the data transfer rate, and as n·Tw is shorter, the data transfer rate becomes higher. In order to shorten the shortest signal length n·Tw, it is necessary to record data at high density by decreasing the spot diameter of the laser beam used for recording and reproducing data or increase the linear recording velocity. In the case where the laser output is kept constant, the amount of heat that accumulates in the recording layer becomes smaller as the linear recording velocity is higher. On the other hand, a laser beam having a shorter wavelength is employed or an objective lens having a larger numerical aperture is employed in a laser beam projecting optical system in order to decrease the spot diameter of a laser beam but in such a case, since energy per unit area of the laser beam spot becomes high, heat tends to accumulate in the recording layer when data are recorded. Therefore, the amount of heat accumulated in the recording layer depends upon the spot diameter of the laser beam and the linear recording velocity. If heat tends to accumulate in the recording layer, the accumulated heat is conducted in the planar direction of the recording layer during recording and a portion of the record marks tends to be re-crystallized, in other words, self-erasing tends to occur. If self-erasing occurs, jitter of the reproduced signal increases. In experiments conducted by the inventors of the present invention, it was found that in the case where n·Tw exceeds 20 ns, the effect of the linear recording velocity becomes relatively great to make self-erasing unlikely to occur and that in the case where n·Tw is equal to or shorter than 20 ns, the effect of reducing the spot diameter of the laser beam becomes relatively great to make self-erasing likely to occur. Therefore, in the case where n·Tw is equal to or shorter than 20 ns, the present invention enables jitter due to self-erasing to be markedly prevented by setting PbiH and PbiL so as to satisfy PbiH/PbiL<1, namely, setting Pbi to be lower as the linear recording velocity increases.

In a phase change type optical recording medium, in order to enable data to be rewritten, the composition of the recording layer and the linear recording velocity of the medium are determined so that a recording mark can be erased (crystallized) by heating. As a result, in data rewritable phase change type optical recording medium, self erasing tends to occur due to heat accumulated in the recording layer. Therefore, the present invention is particularly useful in the case where a phase change type optical recording medium is used as a data rewritable optical recording medium.

The reason why it is preferable in the present invention to set Tcl to be larger as the linear recording velocity is lower is to prevent self erasing. Further, the reason why it is preferable in the present invention to set Tmp and Ttop to be smaller as the linear recording velocity is higher is to prevent self erasing due to heat held in the recording layer.

Since a laser diode has limited responsivity, the laser diode cannot properly be activated when the shortest record mark is to be formed if n·Tw is too short. Therefore, n·Tw is preferably set to satisfy 2 ns≦n·Tw, more preferably to satisfy 4 ns≦n·Tw.

The shortest signal length corresponds to a 2T signal in the 1-7 Modulation Code and in such a case, n is equal to 2. The shortest signal length corresponds to a 3T signal in the 8-16 Modulation Code and in such a case, n is equal to 3.

The so-called data transfer rate interrelates with not only n·Tw but also formatting efficiency, and even if n·Tw is the same, the data transfer rate becomes lower as the format efficiency is lower. Therefore, a recording velocity can be more directly expressed by n·Tw. Among conventional optical recording disks, in a DVD-RAM4.7 having a capacity of 4.7 GB/surface, the linear recording velocity is 8.2 m/s, the data transfer rate is 22 Mbps and n·Tw is 51.41 ns. In a DVD-RW having a capacity of 4.7 GB/surface, the linear recording velocity is 3.5 m/s, the data transfer rate is 11 Mbps and n·Tw is 78.48 ns. Since, as mentioned above, n·Tw$\leq$20 ns is satisfied in the present invention, n·Tw of the present invention is very short in comparison with those in the conventional optical recording disks.

In the present invention, the wavelength $\lambda$ of the laser beam used for recording data and the numerical aperture NA of the objective lens of the laser beam projecting optical system are set so as to satisfy $\lambda/NA \leq 680$ nm, preferably $\lambda/NA \leq 630$ nm. If $\lambda/NA$ is too large, it is difficult to record data at high density because the pitch of the recording track has to be increased. Further, if $\lambda/NA$ is too large, the advantages obtained by applying the present invention are slight because it is difficult to considerably increase the energy density of the beam spot of the laser beam and heat does not easily accumulate in the recording layer. However, since available laser beam wavelengths and available objective lens numerical are limited and it is difficult to employ a laser beam having an extremely short wavelength and an objective lens having an extremely large numerical aperture, it is usually preferable to set $\lambda$ and NA so as to satisfy 350 nm$\leq \lambda/NA$.

In the recording waveform, the ratio of the width of an upward pulse to the width of the set consisting of the upward pulse and the following downward pulse, namely, the duty ratio, is preferably 0.3 to 0.9. If the duty ratio is too small, it is undesirably necessary to use a laser beam having a high power. On the other hand, if the duty ratio is too large, the width, length and shape of the record marks tend to become irregular and, as a result, jitter of the reproduced signal tends to increase.

As described in the above mentioned Japanese Patent Application Laid Open No. 2000-155945, a downward pulse whose power level is lower than the erasing power may be inserted immediately before the first upward pulse and an upward pulse whose intensity is lower than the first upward pulse may be inserted immediately before the first upward pulse, thereby assisting increase in the temperature of the recording layer.

In the present invention, it is unnecessary for the recording pulse section for forming a record mark having a signal length kT(where k is an integer equal to or larger than 1 and T is a reference clock width) to have a width of kT. If the laser projecting time period is set to be kT, the width of the recording pulse section is usually set to be shorter than the signal length to be recorded because the length of a record mark sometimes becomes longer owing to heat transfer in the longitudinal direction of the recording track. Although the number of upward pulses in the recording pulse section for recording a kT signal is set to be (k−2) in FIGS. 1 to 3, the number of upward pulses is not limited to (k−2) and the number thereof may be (k−1) as shown in FIG. 4. Further, in the present invention, the modulation code is not particularly limited.

The present invention is particularly advantageous when it is applied to the mark edge recording method.

In a drive apparatus for an optical recording medium, it is ordinary to superpose a high frequency signal whose frequency is an order or more of magnitude higher than the recording frequency, for example, a high frequency signal having a frequency of several hundreds megahertz, on the drive signal for modulating the intensity of the laser beam for recording, reproducing and erasing data. A direct current laser beam as termed in this specification includes a laser beam modulated by a direct current on which such a high frequency signal is superposed.

Explanation will next be made regarding an example of the configuration of an optical recording medium to which the present invention is applied.

Figure 5:
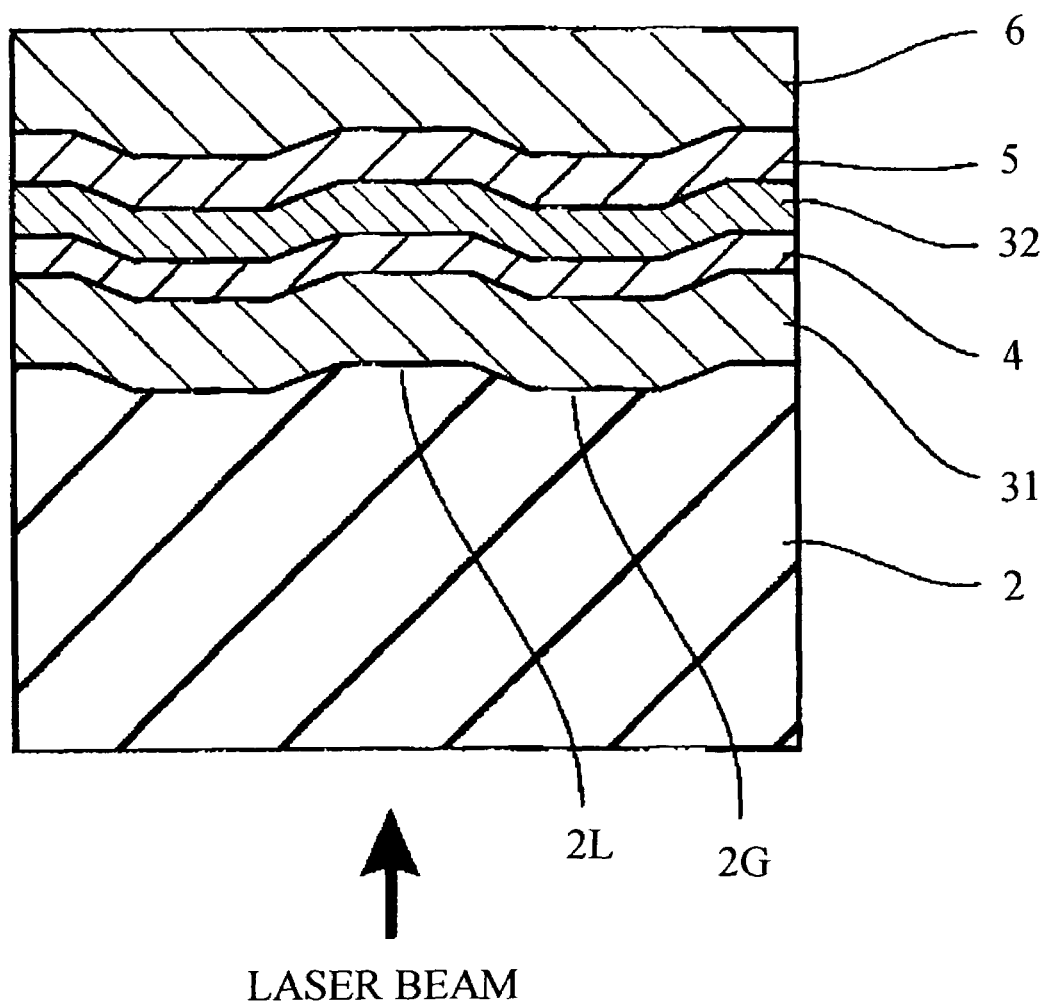
FIG. 5 is a cross sectional view showing one configuration of an optical recording medium.

The Structure Shown in FIG. 5

One configuration of an optical recording medium according to the present invention is shown in FIG. 5. The optical recording medium includes a first dielectric layer 31, a recording layer 4, a second dielectric layer 32, a reflective layer 5 and a protective layer 6 on a light transmittable substrate 2 in this order and a laser beam for recording and reproducing data is impinged onto the light transmittable substrate 2.

The Light Transmittable Substrate 2

The light transmittable substrate 2 has a property of transmitting a laser beam for recording or reproducing data. The light transmittable substrate 2 usually has a thickness of 0.2 to 1.2 mm and preferably has a thickness of 0.4 to 1.2 mm. The light transmittable substrate 2 can be formed of resin but may instead be formed of glass. Grooves (guide grooves) 2G usually formed in an optical recording medium are present on the laser beam incident side and convex portions present between neighboring grooves 2G are lands 2L.

In the present invention, the lands and/or the grooves can be utilized as a recording track.

The First Dielectric Layer 31 and the Second Dielectric Layer 32

These dielectric layers serve to prevent oxidization and degradation of the recording layer and block heat transferred from the recording layer when data are recorded or discharge it in a planar direction, thereby protecting the light transmittable substrate 2. Further, the degree of modulation can be improved by providing these dielectric layers. Each of the dielectric layers may be formed by superposing two or more dielectric layers having different compositions.

It is preferable to employ compounds containing at least one metal element selected from among Si, Ge, Zn, Al, rare earth elements and the like as the dielectric material used for forming these dielectric layers. Oxide, nitride or sulfide is preferably used as the compound for forming these dielectric layers and a mixture containing two or more these compounds may be used for forming these dielectric layers.

In the case where it is required for an optical recording medium to have a quick cooling structure, it is preferable to form the dielectric layers, particularly the second dielectric layer, of a dielectric material having high thermal conductivity. As a dielectric material having high thermal conductivity, a mixture of zinc sulfide and silicon oxide (ZnS—$SiO_2$), aluminum nitride, aluminum oxide, silicon nitride, tantalum oxide and the like are preferable and oxide and/or nitride of aluminum and oxide and/or nitride of silicon are particularly preferable. In the case of using ZnS—$SiO_2$ as a dielectric material, it is preferable to employ ZnS—$SiO_2$ containing 30 to 60 mol % of $SiO_2$. If the content of $SiO_2$ is too small, the thermal conductivity of the mixture becomes too low. On the other hand, if the content $SiO_2$ is too large, the dielectric layer is apt to peel off from the other layers during long storage because the adhesion between the dielectric layer and other layers is insufficient.

In the optical recording medium having a quick cooling structure, the thermal conductivity of the second dielectric layer is preferably equal to or higher than 1 W/mK and more preferably equal to or higher than 1.5 W/mK. There is no particular upper limit on the thermal conductivity of the second dielectric layer but the thermal conductivity of the material usable for forming the dielectric layer is usually equal to or lower than about 20 W/mK. In this specification, the thermal conductivity of the second dielectric layer is not a value measured from a thin film-like dielectric layer but a value measured from a bulk-like dielectric material.

The thickness of each of the first dielectric layer and the second dielectric layer can be properly determined so as to sufficiently serve as a protection layer and sufficiently improve the degree of modulation. Usually, the thickness of the first dielectric layer 31 is preferably 30 to 300 nm and more preferably 50 to 250 nm and the thickness of the second dielectric layer 32 is preferably 10 to 50 nm. It is preferable for a write-once type optical recording medium to have a quick cooling structure so that an amorphous record mark does not readily crystallize, and for this purpose, the thickness of the second dielectric layer 32 is preferably equal to or thinner than 30 nm and more preferably equal to or thinner than 25 nm.

It is preferable to form each of the dielectric layers using the sputtering process.

The Recording Layer 4

The composition of the recording layer is not particularly limited and the material for forming the recording layer can be properly selected from among various phase change materials but it is preferable to select a material containing at least Sb and Te. Since the crystallization temperature of the recording layer consisting of Sb and Te only is a low 130° C. and the storage reliability of the recording layer is not sufficiently high, it is preferable to add other elements to the recording layer for increasing the crystallization temperature of the recording layer. In this case, it is preferable to add at least one element selected from among In, Ag, Au, Bi, Se, Al, P, Ge, H, Si, C, V, W, Ta, Zn, Ti, Sn, Pb, Pd and rare earth elements (Sc, Y and lanthanide). Among these, it is preferable to add at least one element selected from among rare earth elements, Ag, In and Ge, since they can particularly improve the storage reliability.

The material containing Sb and Te preferably has the following composition.

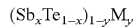   Formula I $(Sb_xTe_{1-x})_{1-y}M_y$ where M is an element other than Sb and Te. It is preferable that x is equal to or larger than 0.2 and equal to or smaller than 0.8 and y is equal to or larger than 0 and equal to or smaller than 0.4 and it is more preferable that x is equal to or larger than 0.5 and equal to or smaller than 0.85 and y is equal to or larger than 0.01 and equal to or smaller than 0.2. Concretely, x may be properly determined in accordance with the linear recording velocity and heat design of the optical recording medium.

If x representing the amount of Sb is too small, the crystallizing rate becomes low to make it difficult to erase a record mark at a relatively high linear velocity. Further, since the reflection coefficient of a crystalline region of the recording layer becomes low, the power of the reproduced signal becomes low. If x is extremely low, it is difficult to record data in the recording layer.

To the contrary, if x is too large, the power of the reproduced signal becomes low because the difference in the reflection coefficients between a crystalline region and an amorphous region of the recording layer becomes low.

The element M is not particularly limited but it is preferable to select at least one element from the above mentioned elements capable of improving the storage reliability. If y representing the amount of the element M is too large, the crystallizing rate becomes too high and the power of the reproduced signal becomes low.

The thickness of the recording layer is preferably greater than 4 nm and equal to or thinner than 50 nm and more preferably 5 to 30 nm. If the recording layer is too thin, a crystalline phase is hard to grow and it is difficult to crystallize the recording layer. On the other hand, if the recording layer is too thick, the heat capacity of the recording layer becomes large, which makes it difficult to record data and lowers the power of the reproduced signal.

It is preferable to form the recording layer using the sputtering process.

In the present invention, the structure of the recording layer is not particularly limited and the present invention can be applied to an optical recording medium having a multi-layered recording layer as described in, for example, Japanese Patent Application Laid Open No. 8-221814 or Japanese Patent Application Laid Open No. 10-226173.

The Reflective Layer 5

The material for forming the reflective layer is not particularly limited and the reflective layer may be formed of a metal or semi-metal such as Al, Au, Ag, Pt, Cu, Ni, Cr, Ti, Si or the like or an alloy containing one or more kinds of these elements.

In the case where it is required for the optical recording medium to have a quick cooling structure, it is preferable to form the reflective layer of a material having high thermal conductivity. Ag or Al is preferably employed as the material having high thermal conductivity. However, since a reflective layer made of Ag or Al alone does not have sufficient corrosion resistance, it is preferable to add an element to the reflective layer that improves the corrosion resistance thereof.

However, since addition of an element other than Ag or Al to the reflective layer lowers the thermal conductivity of the reflective layer, it is preferable to employ Ag, which has higher thermal conductivity, as a main component. Illustrative examples of sub-ingredients to be added together with Ag include Mg, Pd, Ce, Cu, Ge, La, S, Sb, Si, Te and Zr. It is preferable to use at least one of these sub-ingredients and more preferably two or more thereof. The amount of each of the sub-ingredients to be added to the reflective layer is 0.05 to 2.0 atomic % and preferably 0.2 to 1.0 atomic % and the total amount of the sub-ingredients to be added to the reflective layer is 0.2 to 5.0 atomic % and preferably 0.5 to 3.0 atomic %. If the amount of the sub-ingredients added to the reflective layer is too small, corrosion resistance cannot be sufficiently improved. On the other hand, if the amount of the sub-ingredients added to the reflective layer is too large, the thermal conductivity of the reflective layer is low.

In the case where it is required for the optical recording medium to have a quick cooling structure, the thermal conductivity of the reflective layer is preferably equal to or higher than 100 W/mK and more preferably equal to or higher than 150 W/mK. The thermal conductivity of the reflective layer can be calculated using the Wiedemann-Franz law based on the electrical conductivity of the reflective layer measured by the four-probe method, for example. There is no particular upper limit on the thermal conductivity of the reflective layer. In other words, it is possible to employ pure silver having a thermal conductivity of 250 W/mK, which is the highest among those of materials usable for reflective layer.

Usually, the thickness of the reflective layer is preferably 10 to 300 nm. If the thickness of the reflective layer is thinner than 10 nm, a reflective layer having a sufficiently high reflective coefficient cannot be obtained. On the other hand, increasing the thickness of the reflective layer beyond 300 nm produces only a small improvement in the reflective coefficient of the reflective layer that is disproportionate to the increase in cost. It is preferable to form the reflective layer using a gas phase growth process such as a sputtering process, a vapor deposition process or the like.

The Protective Layer 6

The protective layer 6 is provided in order to improve the abrasion resistance and corrosion resistance of the optical recording medium. The protective layer can be preferably formed of any of various organic materials and can be particularly preferably formed by irradiating a radiation curable type compound or the components thereof with an electron beam, an ultraviolet ray or the like, thereby curing it. The thickness of the protective layer is usually about 0.1 to 100 µm and the protective layer is usually formed using a spin coating process, a gravure coating process, a spray coating process, a dip coating process or the like.

Figure 6:
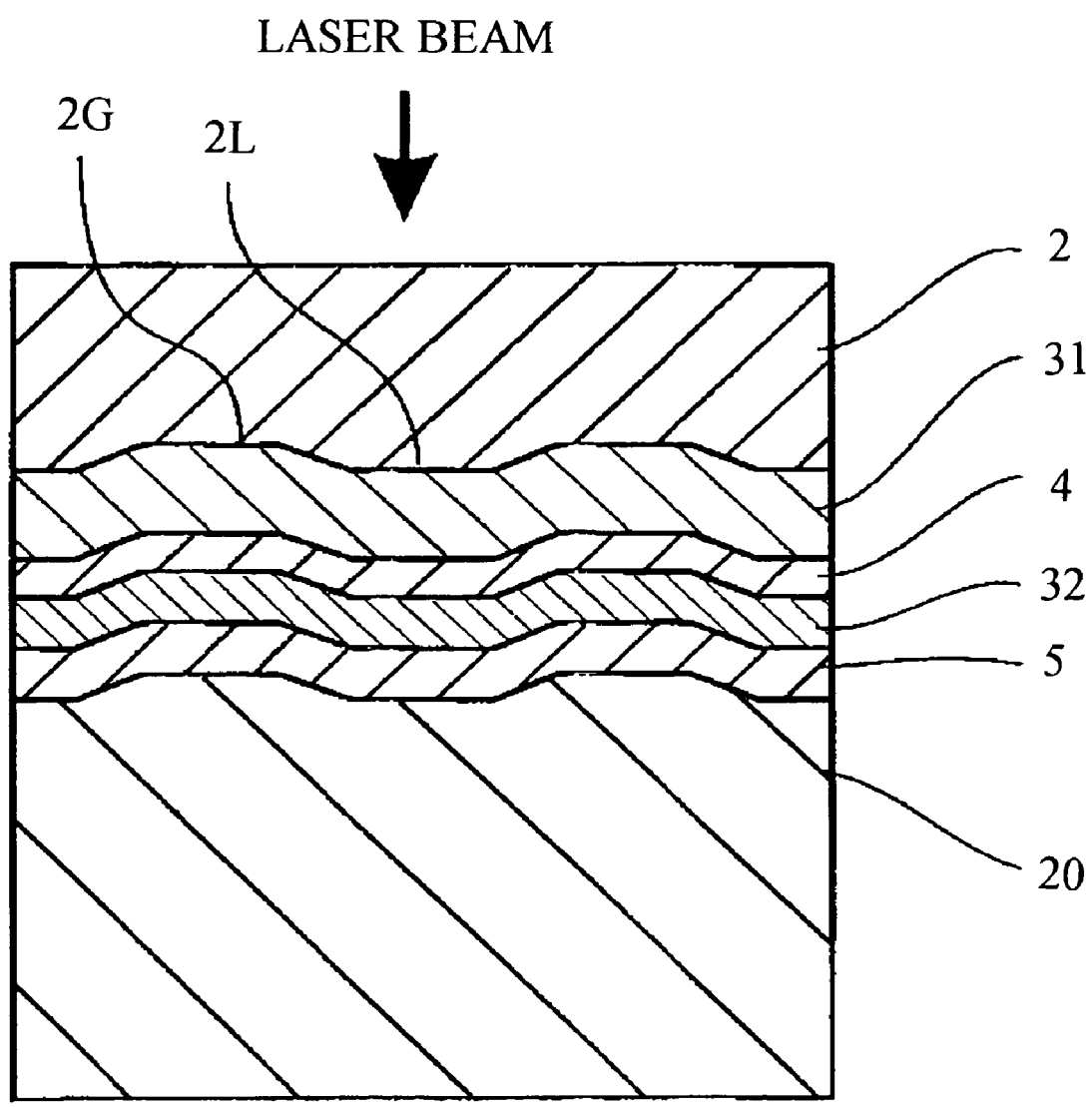
FIG. 6 is a cross sectional view showing another configuration of an optical recording medium.

The Structure Shown in FIG. 6

Another configuration of an optical recording medium according to the present invention is shown in FIG. 6. This optical recording medium includes a reflective layer 5 made of a metal or semi-metal, a second dielectric layer 32, a recording layer 4, a first dielectric layer 31 and a light transmittable substrate 2 on a support substrate 20 in this order. A laser beam for recording and reproducing data is impinged onto the light transmittable substrate 2. An intermediate layer such as a dielectric layer may be formed between the support substrate 20 and the reflective layer 5.

As the light transmittable substrate 2 of this optical recording medium, a resin plate or a glass plate having substantially the same thickness of that of the light transmittable substrate 2 shown in FIG. 5 may be employed. However, it is preferable to make the light transmittable substrate 2 thinner in order to make the numerical aperture of the recording and reproducing optical system larger and record data at high density. In such a case, a light transmittable support 2 having a thickness of 20 to 300 µm is preferably selected. If the light transmittable support 2 is too thin, the optical property of the optical recording medium is greatly affected by dust adhering to the surface of the light transmittable substrate 2. On the other hand, if the light transmittable substrate 2 is too thick, it is difficult to record data at high density by making the numerical aperture of the recording and reproducing optical system larger.

The light transmittable substrate 2 can be made thinner by adhering a light transmittable sheet made of a light transmittable resin onto the first dielectric layer 31 using any of various adhesives or sticking agents or directly coating a light transmittable resin layer on the first dielectric layer 31, for example.

The support substrate 20 is provided for ensuring rigidity of the optical recording medium. The support substrate 20 may have the same thickness as that of the light transmittable substrate 2 shown in FIG. 5 and may be formed of the same material as that of the light transmittable substrate 2 shown in FIG. 5. The support substrate 20 may be transparent or opaque. As shown in FIG. 6, grooves 2G can be formed by transferring grooves formed on the support substrate 20 onto the respective layers.

Other layers have the same configuration as that of the corresponding layers of the optical recording medium shown in FIG. 5.

Explanation will next be made as to the structure of an optical recording apparatus to which the present invention can be applied.

Figure 7:
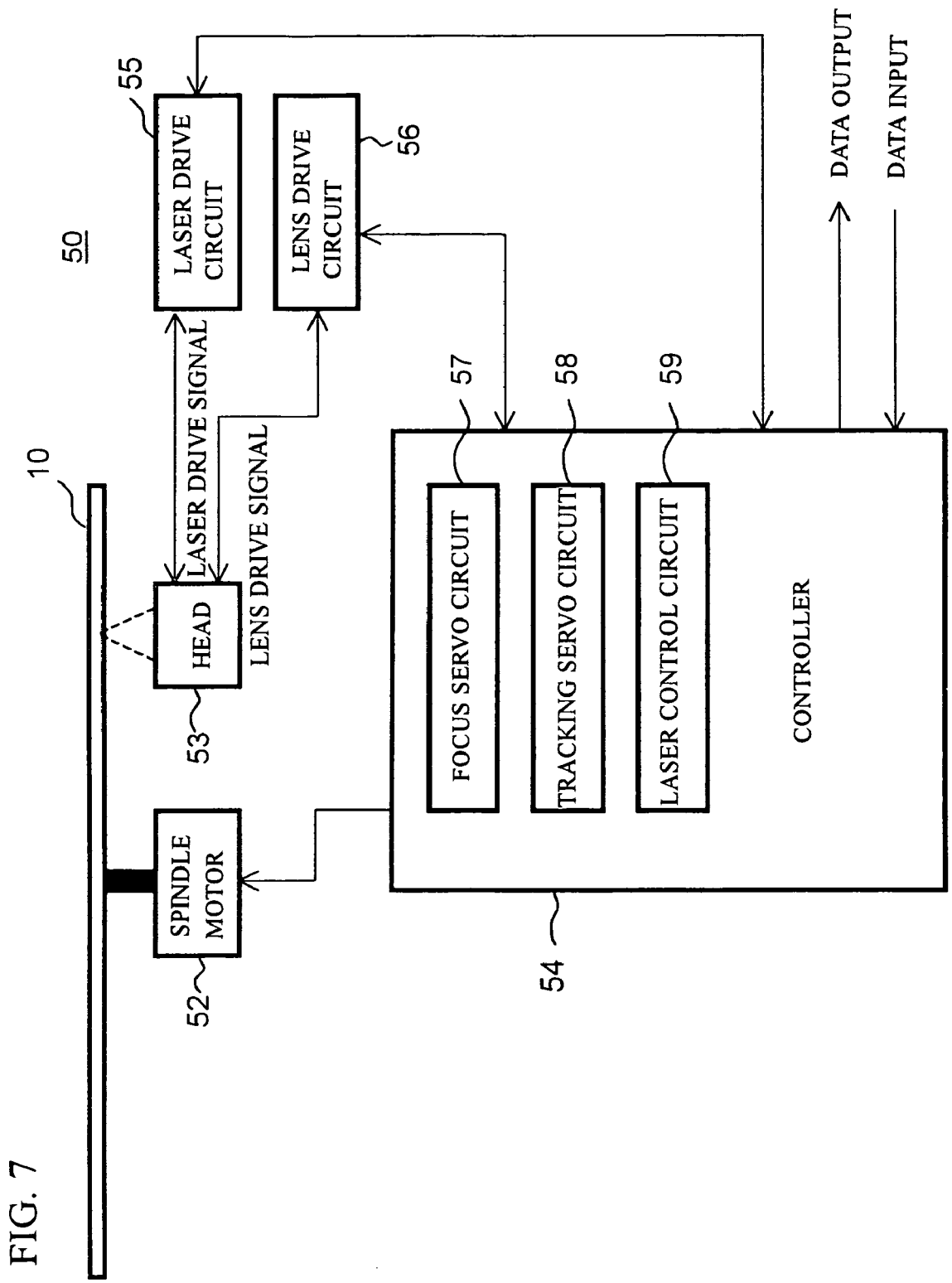
FIG. 7 is a block diagram schematically showing a primary portion of an optical recording apparatus 50 for recording data in an optical recording medium shown in FIG. 5 or 6.

FIG. 7 is a block diagram schematically showing a main portion of an optical recording apparatus 50 for recording data in the optical recording media shown in FIGS. 5 and 6.

As shown in FIG. 7, the optical recording apparatus 50 includes a spindle motor 52 for rotating the optical recording medium 10, a head 53 for projecting a recording beam onto the optical recording medium 10 and receiving light reflected from the optical recording medium 10, a controller 54 for controlling the operations of the spindle motor 52 and the head 53, a laser drive circuit 55 for feeding a laser drive signal to the head 53 and a lens drive circuit 56 for feeding a lens drive signal to the head 53.

Further, as shown in FIG. 7, the controller 54 includes a focus servo circuit 57, a tracking servo circuit 58 and a laser control circuit 59. When the focus servo circuit 57 is activated, a laser beam is focused on the recording surface of the optical recording medium 10 being rotated and when the tracking servo circuit 58 is activated, the spot of the laser beam automatically follows a track of the optical recording medium 10. The focus servo circuit 57 and the tracking servo circuit 58 have automatic gain control capability for automatically focus gain and automatic gain control capability for automatically tracking gain, respectively. The laser control circuit 59 is adapted for generating a laser drive signal to be fed by the laser drive circuit 55 based on information for setting recording conditions stored in the optical recording medium 10 or the like.

It is not absolutely necessary for the focus servo circuit 57, the tracking servo circuit 58 and the laser control circuit 59 to be incorporated into the controller 54 but they may be provided independently of the controller 54. Further, it is not absolutely necessary for these circuits to be constituted as physical circuits and the functions thereof may be performed in the controller 54 by software.

When data are to be recorded in the optical recording medium 10 according to this embodiment using the thus constituted optical recording apparatus 50, as described above, information for setting recording conditions stored in the optical recording medium 10 or the like are read and write strategy is determined based on the thus read information for setting recording conditions.

Therefore, for example, when data are to be recorded in the optical recording medium 10 at 2× linear recording velocity $V_L$ by the optical recording apparatus 50, the recording power and the bias power are set to be PwL and PbiL, respectively, and the pulse width of the top pulse, the pulse width of the multi-pulse, the pulse width of the last pulse and the pulse with of the cooling pulse are set to be TtopL, TmpL, TlpL and TclL, respectively. On the other hand, when data are to be recorded in the optical recording medium 10 at the 4× linear recording velocity $V_H$ by the optical recording apparatus 50, the recording power and the bias power are set to be PwH and PbiH, respectively and the pulse width of the top pulse, the pulse width of the multi-pulse, the pulse width of the last pulse and the pulse with of the cooling pulse are set to be TtopH, TmpH, TlpH and TclH, respectively.

Further, the bias power and the recording power at each of the linear recording velocities $V_L$ and $V_H$ is set so as to satisfy PbiH/PbiL<1 and (PbiH/PwH)/(PbiL/PwL)<1 and the pulse widths are preferably set so as to satisfy TclH/TclL<1, TmpH/TmpL≦1, TtopH/TtopL≦1 and 1≦TlpH/TlpL. As a result, jitter of reproduced signals can be reduced when data are recorded both at the 2× linear recording velocity and the 4× linear recording velocity.

WORKING EXAMPLES

Working Example 1

A sample of the optical recording disk shown in FIG. 6 was fabricated in the following manner.

A disk-like polycarbonate plate having a diameter of 120 mm and a thickness of 1.1 mm was used as a support substrate 20 and a raised and depressed pattern was formed on the surface of the support substrate 20 so as to form grooves and lands on a light transmittable substrate 2.

A reflective layer 5 was formed using the sputtering process in an atmosphere of Ar gas. As a target, $Ag_{98}Pd_1Cu_1$ was used. The thickness of the reflective layer was 100 nm.

A second dielectric layer 32 was formed by the sputtering process using a target of $Al_2O_3$ in the atmosphere of Ar gas. The thickness of the second dielectric layer was 20 nm.

A recording layer 4 was formed by the sputtering process using an alloy target in the atmosphere of Ar gas. The composition (atomic ratio) of the recording layer was $\{(Sb_{0.82}Te_{0.18})_{0.93}M(In_{0.14}Ge_{0.86})_{0.07}\}_{0.98}Tb_{0.02}$. The thickness of the recording layer was 12 nm.

The linear recording velocity V, pulse intensities Pw, Pbi, ratio of the pulse intensities Pw/Pbi, pulse widths Tcl, Tmp, Ttop and Tlp were varied as shown in Table 1. Jitter of the reproduced signals is shown in Table 1. In Table 1, N is the relative linear recording velocity in relation to the linear recording velocity of 5.7 m/s and N=V/5.7. Pbo was fixed to be 0.1 mW and the sum of the width of an upward pulse and the width of a downward pulse in multi-pulses was 1 T. Therefore, the duty ratio was equal to Tmp. Further, in the recording waveforms shown in FIGS. 2 and 3, parameters other than Tmp were set so as to be the same as those of the recording waveform shown in FIG. 1. The shortest signal length n·Tw was 30.3 ns at the linear recording velocity of 5.7 m/s and it was 11.8 ns at the linear recording velocity of 14.6 m/s.

Jitter shown in Table 1 is clock jitter calculated as σ/Tw (%) where Tw is the width of a window and fluctuations σ is the fluctuation of the reproduced signals measured using a Time Interval Analyzer manufactured by Yokogawa Electric Corporation. The clock jitter indicates time fluctuation of a reproduced signal with respect to a frequency corresponding to the reference clock width (1T). Even if the tilt margin is considered, in other words, the optical recording disk is tilted to increase jitter, there is no problem about signal quality if the clock jitter is equal to or lower than 10%, preferably equal to or lower than 9% when the optical recording disk is not tilted.

TABLE 1

| Case # | V (m/s) | N = V/5.7 | Pw (mW) | Pbi (mW) | Pbi/Pw | Tcl (T) | Tmp (T) | Ttop (T) | Tlp (T) | Jitter (%) |
|---|---|---|---|---|---|---|---|---|---|---|
| 101 | 5.7 | 1 | 4.5 | 2.0 | 0.444 | 1.00 | 0.40 | 0.40 | 0.50 | 8.3 |
| 102 | 11.4 | 2 | 4.5 | 1.6 | 0.356 | 0.60 | 0.40 | 0.40 | 0.60 | 8.3 |
| 103 | 14.6 | 2.56 | 4.5 | 1.4 | 0.311 | 0.40 | 0.35 | 0.40 | 0.60 | 8.5 |
| 104 | 14.6 | 2.56 | 4.5 | 1.4 | 0.311 | 1.10 | 0.35 | 0.40 | 0.60 | 9.8 |
| 105 | 14.6 | 2.56 | 4.5 | 1.4 | 0.311 | 0.40 | 0.50 | 0.40 | 0.60 | 9.7 |

A first dielectric layer 31 was formed by the sputtering process using a target of ZnS—SiO2 (mole ratio 80:20) in the atmosphere of Ar gas. The thickness of the first dielectric layer was 130 nm.

Further, a light transmittable substrate 2 was formed by adhering a polycarbonate sheet having a thickness of 100 μm onto the surface of the first dielectric layer 31 via an adhesive layer of a solvent-type ultraviolet ray curable type acrylic resin having a thickness of 3 μm.

The recording layer of the thus fabricated optical recording medium was initialized (crystallized) using a bulk eraser.

Then, signals were recorded in the recording layer on the grooves using a DDU1000 optical recording medium evaluation apparatus manufactured by Pulstec Industrial Co., Ltd. under the following conditions and recorded signals were reproduced.

Wavelength of laser beam: 405 nm

Numerical aperture of objective lens: 0.85

Recording Signal: (1.7) RLL modulation signal

In all cases shown in Table 1, PbiH/PbiL<1 and (PbiH/PwH)/(PbiL/PwL)<1 were satisfied at all linear recording velocities. As a result, jitter was equal to or lower than 10% in all cases.

Further, TclH/TclL<1 and TmpH/TmpL≦1, were satisfied in cases # 101 to 103. As a result, jitter was equal to or lower than 9% in these cases.

The jitter shown in Table 1 was measured after overwriting operation was repeated ten times. Namely, it was possible to overwrite data at all linear recording velocities in this optical recording disk sample.

Comparative Example 1

Data were recorded in and reproduced from the optical recording disk sample in the manner of Working Example 1 except that data were recorded under the conditions shown in Table 2 and clock jitter was measured. The results are shown in Table 2. In case # 201, all recording conditions were the same as those in the case # 101.

TABLE 2

| Case # | V (m/s) | N = V/5.7 | Pw (mW) | Pbi (mW) | Pbi/Pw | Tcl (T) | Tmp (T) | Ttop (T) | Tlp (T) | Jitter (%) |
|---|---|---|---|---|---|---|---|---|---|---|
| 201 | 5.7 | 1 | 4.5 | 2.0 | 0.444 | 1.00 | 0.40 | 0.40 | 0.50 | 8.3 |
| 202 | 14.6 | 2.56 | 4.5 | 2.2 | 0.489 | 0.40 | 0.35 | 0.40 | 0.60 | 13.2 |
| 203 | 14.6 | 2.56 | 3.0 | 1.4 | 0.460 | 0.40 | 0.35 | 0.40 | 0.60 | 12.1 |

If case # 201 where jitter was within a tolerance range is taken as a reference case, PbiH/PbiL<1 was not satisfied between the reference case and case # 202. Further, (PbiH/PwH)/(PbiL/PwL)<1 was not satisfied between the reference case and cases # 202 and #203. As a result, jitter exceeded the tolerance range in cases # 202 and # 203.

According to the present invention, since the recording waveform is controlled in accordance with the linear recording velocity in multi-pulse recording, jitter of the reproduced signal can be reduced even when data are recorded at a wide range of linear recording velocities.

The invention claimed is:

1. An optical recording method for recording data in an optical recording medium having a recording layer containing a phase change material at a plurality of linear recording velocities or a continuously changing linear recording velocity using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, Pbi and Pw being set so as to satisfy PbiH/PbiL<1 and (PbiH/PwH)/(PbiL/PwL)<1 where PbiL and PwL are Pbi and Pw when data are to be recorded at a linear recording velocity $V_L$ selected from among the plurality of linear recording velocities or the continuously changing linear recording velocity and PbiH and PwH are Pbi and Pw when data are to be recorded at a linear recording velocity $V_H$ which satisfies $1.1 \leq V_H/V_L$.

2. An optical recording method for recording data in an optical recording medium in accordance with claim 1, wherein the recording pulse section further includes a downward pulse having a width of Tcl and following the last upward pulse and TclL and TclH are set so as to satisfy TclH/TclL<1 where TclL is Tcl when data are to be recorded at the linear recording velocity $V_L$ and TclH is Tcl when data are to be recorded at the linear recording velocity $V_H$.

3. An optical recording method for recording data in an optical recording medium in accordance with claim 1, wherein the upward pulse between the first upward pulse and the last upward pulse has a width Tmp, and TmpL and TmpH are set so as to satisfy TmpH/TmpL≦1 where TmpL is Tmp when data are to be recorded at the linear recording velocity $V_L$ and TmpH is Tmp when data are to be recorded at the linear recording velocity $V_H$.

4. An optical recording method for recording data in an optical recording medium in accordance with claim 1, wherein the first upward pulse has a width of Ttop, and TtopL and TtopH are set so as to satisfy TtopH/TtopL≦1 where TtopL is Ttop when data are to be recorded at the linear recording velocity $V_L$ and TtopH is Ttop when data are to be recorded at the linear recording velocity $V_H$.

5. An optical recording method for recording data in an optical recording medium in accordance with claim 1, wherein the last upward pulse has a width of Tlp, and TlpL and TlpH are set so as to satisfy 1≦TlpH/TlpL where TlpL is Tlp when data are to be recorded at the linear recording velocity $V_L$ and TlpH is Tlp when data are to be recorded at the linear recording velocity $V_H$.

6. An optical recording method for recording data in an optical recording medium in accordance with claim 1, wherein the intensities of the pulses and the widths of the pulses used at the respective linear recording velocities $V_L$ and $V_H$ are determined by test recording.

7. An optical recording method for recording data in an optical recording medium in accordance with claim 1, wherein n·Tw≦20 ns is satisfied at a highest linear recording velocity where Tw is a width of a detection window and n·Tw is a signal length corresponding to a shortest record mark.

8. An optical recording method for recording data in an optical recording medium having a recording layer containing a phase change material at a linear recording velocity selected from among a plurality of linear recording velocities using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, Pbi and Pw being set so as to satisfy PbiH/PbiL<1 and (PbiH/PwH)/(PbiL/PwL)<1 where PbiL and PwL are Pbi and Pw when data are to be recorded at a linear recording velocity $V_L$ and PbiH and PwH are Pbi and Pw when data are to be recorded at a linear recording velocity $V_H$ which satisfies $1.1 \leq V_H/V_L$.

9. An optical recording method for recording data in an optical recording medium in accordance with claim 8, wherein the recording pulse section further includes a downward pulse having a width of Tcl and following the last upward pulse and TclL and TclH are set so as to satisfy TclH/TclL<1 where TclL is Tcl when data are to be recorded at the linear recording velocity $V_L$ and TclH is Tcl when data are to be recorded at the linear recording velocity $V_H$.

10. An optical recording method for recording data in an optical recording medium in accordance with claim 8, wherein the upward pulse between the first upward pulse and the last upward pulse has a width Tmp, and TmpL and TmpH are set so as to satisfy TmpH/TmpL≦1 where TmpL is Tmp when data are to be recorded at the linear recording velocity $V_L$ and TmpH is Tmp when data are to be recorded at the linear recording velocity $V_H$.

11. An optical recording method for recording data in an optical recording medium in accordance with claim 8, wherein the first upward pulse has a width of Ttop, and TtopL and TtopH are set so as to satisfy TtopH/TtopL≦1 where TtopL is Ttop when data are to be recorded at the linear recording velocity $V_L$ and TtopH is Ttop when data are to be recorded at the linear recording velocity $V_H$.

12. An optical recording method for recording data in an optical recording medium in accordance with claim 8, wherein the last upward pulse has a width of Tlp, and TlpL and TlpH are set so as to satisfy $1 \leq TlpH/TlpL$ where TlpL is Tlp when data are to be recorded at the linear recording velocity $V_L$ and TlpH is Tlp when data are to be recorded at the linear recording velocity $V_H$.

13. An optical recording method for recording data in an optical recording medium in accordance with claim 8, wherein the intensities of the pulses and the widths of the pulses used at the respective linear recording velocities $V_L$ and $V_H$ are determined by test recording.

14. An optical recording method for recording data in an optical recording medium in accordance with claim 8, wherein $n \cdot Tw \leq 20$ ns is satisfied at a highest linear recording velocity where Tw is a width of a detection window and $n \cdot Tw$ is a signal length corresponding to a shortest record mark.

15. An optical recording method for recording data in an optical recording medium having a recording layer containing a phase change material using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, a reference linear recording velocity and recommended values of Pw and Pbi when data are to be recorded at the reference linear recording velocity being given, and PbiL, which is Pbi when data are to be recorded at a linear recording velocity $V_L$, and PbiH, which is Pbi when data are to be recorded at a linear recording velocity $V_H$, being set so as to satisfy PbiH/PbiL<1 and (PbiH/Pwh)/(PbiL/PwL)<1 where one of the linear recording velocity $V_L$ and the linear recording velocity $V_H$ is the reference linear recording velocity and the other thereof is a linear recording velocity used for test recording, the linear recording velocity $V_L$ and the linear recording velocity $V_H$ satisfy $1.1 \leq V_H/V_L$, thereby determining Pw and Pbi used for the test recording or when data are to be recorded at a linear recording velocity region including the linear recording velocity for the test recording.

16. An optical recording method for recording data in an optical recording medium in accordance with claim 15, wherein the recording pulse section further includes a downward pulse following the last upward pulse and having a width of Tcl, a recommended value of Tcl when data are to be recorded at the reference linear recording velocity is given, and Tcl for the test recording is set so as to satisfy TclH/TclL<1 where TclL is Tcl when data are to be recorded at the linear recording velocity $V_L$ and TclH is Tcl when data are to be recorded at the linear recording velocity $V_H$, thereby determining Tcl used for the test recording or when data are to be recorded at a linear recording velocity region including the linear recording velocity for the test recording.

17. An optical recording method for recording data in an optical recording medium in accordance with claim 15, wherein the upward pulse between the first upward pulse and the last upward pulse has a width Tmp, a recommended value of Tmp at the reference linear recording velocity is given, and Tmp for the test recording is set so as to satisfy TmpH/TmpL$\leq$1 where TmpL is Tmp when data are to be recorded at the linear recording velocity $V_L$ and TmpH is Tmp when data are to be recorded at the linear recording velocity $V_H$, thereby determining Tmp used for the test recording or when data are to be recorded at a linear recording velocity region including the linear recording velocity for the test recording.

18. An optical recording method for recording data in an optical recording medium in accordance with claim 15, wherein the first pulse has a width Ttop, a recommended value of Ttop at the reference linear recording velocity is given, and Ttop for the test recording is set so as to satisfy TtopH/TtopL$\leq$1 where TtopL is Ttop when data are to be recorded at the linear recording velocity $V_L$ and TtopH is Ttop when data are to be recorded at the linear recording velocity $V_H$, thereby determining Ttop used for the test recording or when data are to be recorded at a linear recording velocity region including the linear recording velocity for the test recording.

19. An optical recording method for recording data in an optical recording medium in accordance with claim 15, wherein the last pulse has a width Tlp, a recommended value of Tlp at the reference linear recording velocity is given, and Tlp for the test recording is set so as to satisfy $1 \leq TlpH/TlpL$ where TlpL is Tlp when data are to be recorded at the linear recording velocity $V_L$ and TlpH is Tlp when data are to be recorded at the linear recording velocity $V_H$, thereby determining Tlp used for the test recording or when data are to be recorded at a linear recording velocity region including the linear recording velocity for the test recording.

20. An optical recording method for recording data in an optical recording medium in accordance with claim 15, wherein $n \cdot Tw \leq 20$ ns is satisfied at a highest linear recording velocity where Tw is a width of a detection window and $n \cdot Tw$ is a signal length corresponding to a shortest record mark.

21. An optical recording apparatus for recording data in an optical recording medium having a recording layer containing a phase change material at a linear recording velocity selected from among a plurality of linear recording velocities using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, Pbi and Pw being set so as to satisfy PbiH/PbiL<1 and (PbiH/PwH)/(PbiL/PwL)<1 where PbiL and PwL are Pbi and Pw when data are to be recorded at a linear recording velocity $V_L$ and PbiH and PwH are Pbi and Pw when data are to be recorded at a linear recording velocity $V_H$ which satisfies $1.1 \leq V_H/V_L$, the recording pulse section further including a downward pulse having a width of Tcl and following the last upward pulse and TclL and TclH being set so as to satisfy TclH/TclL<1 where TclL is Tcl when data are to be recorded at the linear recording velocity $V_L$ and TclH is Tcl when data are to be recorded at the linear recording velocity $V_H$, the optical recording apparatus being constituted so as to store pulse intensities and pulse widths used at the linear recording velocity $V_L$ and the linear recording velocity $V_H$.

22. An optical recording apparatus for recording data in an optical recording medium in accordance with claim 21, wherein the upward pulse between the first upward pulse and the last upward pulse has a width Tmp, and TmpL and TmpH are set so as to satisfy TmpH/TmpL$\leq$1 where TmpL is Tmp when data are to be recorded at the linear recording velocity $V_L$ and TmpH is Tmp when data are to be recorded at the linear recording velocity $V_H$.

23. An optical recording apparatus for recording data in an optical recording medium in accordance with claim 22, which is constituted so as to store a plurality of pulse intensities and a plurality of pulse widths used at each of the linear recording velocity $V_L$ and the linear recording velocity $V_H$ and select a pulse intensity and a pulse width used for recording data in the optical recording medium from the plurality of pulse intensities and the plurality of pulse widths by test recording of data in the optical recording medium.

24. An optical recording apparatus for recording data in an optical recording medium in accordance with claim 22, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store the functions.

25. An optical recording apparatus for recording data in an optical recording medium in accordance with claim 22, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store a plurality of the functions for each of the linear recording velocity $V_L$ and the linear recording velocity $V_H$ and select functions used for recording data in the optical recording medium from the plurality of the functions by test recording of data in the optical recording medium.

26. An optical recording apparatus for recording data in an optical recording medium in accordance with claim 21, wherein the first upward pulse has a width of Ttop, and TtopL and TtopH are set so as to satisfy TtopH/TtopL≦1 where TtopL is Ttop when data are to be recorded at the linear recording velocity $V_L$ and TtopH is Ttop when data are to be recorded at the linear recording velocity $V_H$.

27. An optical recording apparatus for recording data in an optical recording medium in accordance with claim 26, which is constituted so as to store a plurality of pulse intensities and a plurality of pulse widths used at each of the linear recording velocity $V_L$ and the linear recording velocity $V_H$ and select a pulse intensity and a pulse width used for recording data in the optical recording medium from the plurality of pulse intensities and the plurality of pulse widths by test recording of data in the optical recording medium.

28. An optical recording apparatus for recording data in an optical recording medium in accordance with claim 26, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store the functions.

29. An optical recording apparatus for recording data in an optical recording medium in accordance with claim 26, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store a plurality of the functions for each of the linear recording velocity $V_L$ and the linear recording velocity $V_H$ and select functions used for recording data in the optical recording medium from the plurality of the functions by test recording of data in the optical recording medium.

30. An optical recording apparatus for recording data in an optical recording medium in accordance with claim 21, wherein the last upward pulse has a width of Tlp, and TlpL and TlpH are set so as to satisfy 1≦TlpH/TlpL where TlpL is Tlp when data are to be recorded at the linear recording velocity $V_L$ and TlpH is Tlp when data are to be recorded at the linear recording velocity $V_H$.

31. An optical recording apparatus for recording data in an optical recording medium in accordance with claim 30, which is constituted so as to store a plurality of pulse intensities and a plurality of pulse widths used at each of the linear recording velocity $V_L$ and the linear recording velocity $V_H$ and select a pulse intensity and a pulse width used for recording data in the optical recording medium from the plurality of pulse intensities and the plurality of pulse widths by test recording of data in the optical recording medium.

32. An optical recording apparatus for recording data in an optical recording medium in accordance with claim 30, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store the functions.

33. An optical recording apparatus for recording data in an optical recording medium in accordance with claim 30, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store a plurality of the functions for each of the linear recording velocity $V_L$ and the linear recording velocity $V_H$ and select functions used for recording data in the optical recording medium from the plurality of the functions by test recording of data in the optical recording medium.

34. An optical recording apparatus for recording data in an optical recording medium in accordance with claim 21, which is constituted so as to store a plurality of pulse intensities and a plurality of pulse widths used at each of the linear recording velocity $V_L$ and the linear recording velocity $V_H$ and select a pulse intensity and a pulse width used for recording data in the optical recording medium from the plurality of pulse intensities and the plurality of pulse widths by test recording of data in the optical recording medium.

35. An optical recording apparatus for recording data in an optical recording medium in accordance with claim 21, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store the functions.

36. An optical recording apparatus for recording data in an optical recording medium in accordance with claim 21, wherein pulse intensities and pulse widths used at the linear recording velocity $V_L$ and the linear recording velocity $V_H$ are defined as functions of the linear recording velocity $V_L$ and the linear recording velocity $V_H$, the optical recording apparatus being constituted so as to store a plurality of the functions for each of the linear recording velocity $V_L$ and the linear recording velocity $V_H$ and select functions used for recording data in the optical recording medium from the plurality of the functions by test recording of data in the optical recording medium.

37. An optical recording apparatus for recording data in an optical recording medium having a recording layer containing a phase change material using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, a reference linear recording velocity and recommended values of Pw and Pbi when data are to be recorded at the reference linear recording velocity being given, and PbiL, which is Pbi when data are to be recorded at a linear recording velocity $V_L$, and PbiH, which is Pbi when data are to be recorded at a linear recording velocity $V_H$, being set so as to satisfy PbiH/PbiL<1 and (PbiH/PwH)/(PbiL/PwL)<1 where one of the linear recording velocity $V_L$ and the linear recording velocity $V_H$ is the reference linear recording velocity and the other thereof is a linear recording velocity used for test recording, the linear recording velocity $V_L$ and the linear recording velocity $V_H$ satisfy $1.1 \leq V_H/V_L$, thereby determining Pw and Pbi used for the test recording or when data are to be recorded at a linear recording velocity region including the linear recording velocity for the test recording, the recording section further including a downward pulse following the last upward pulse and having a width of Tcl, a recommended value of Tcl when data are to be recorded at the reference linear recording velocity being given, and Tcl for the test recording being set so as to satisfy TclH/TclL<1 where TclL is Tcl when data are to be recorded at the linear recording velocity $V_L$ and TclH is Tcl when data are to be recorded at the linear recording velocity $V_H$, thereby determining Tcl used for the test recording or when data are to be recorded at a linear recording velocity region including the linear recording velocity for the test recording.

38. An optical recording apparatus for recording data in an optical recording medium in accordance with claim 37, wherein the upward pulse between the first upward pulse and the last upward pulse has a width Tmp, a recommended value of Tmp at the reference linear recording velocity is given, and Tmp for the test recording is set so as to satisfy TmpH/TmpL$\leq$1 where TmpL is Tmp when data are to be recorded at the linear recording velocity $V_L$ and TmpH is Tmp when data are to be recorded at the linear recording velocity $V_H$, thereby determining Tmp used for the test recording or when data are to be recorded at a linear recording velocity region including the linear recording velocity for the test recording.

39. An optical recording apparatus for recording data in an optical recording medium in accordance with claim 37, wherein the first pulse has a width Ttop, a recommended value of Ttop at the reference linear recording velocity is given, and Ttop for the test recording is set so as to satisfy TtopH/TtopL$\leq$1 where TtopL is Ttop when data are to be recorded at the linear recording velocity $V_L$ and TtopH is Ttop when data are to be recorded at the linear recording velocity $V_H$, thereby determining Ttop used for the test recording or when data are to be recorded at a linear recording velocity region including the linear recording velocity for the test recording.

40. An optical recording apparatus for recording data in an optical recording medium in accordance with claim 37, wherein the last pulse has a width Tlp, a recommended value of Tlp at the reference linear recording velocity is given, and Tlp for the test recording is set so as to satisfy $1 \leq$ TlpH/TlpL where TlpL is Tlp when data are to be recorded at the linear recording velocity $V_L$ and TlpH is Tlp when data are to be recorded at the linear recording velocity $V_H$, thereby determining Tlp used for the test recording or when data are to be recorded at a linear recording velocity region including the linear recording velocity for the test recording.

41. An optical recording medium having a recording layer containing a phase change material in which data are to be recorded at a linear recording velocity selected from among a plurality of linear recording velocities using a recording beam whose intensity is modulated in accordance with a recording waveform, the recording waveform including a direct current section having an intensity of Pbi and a recording pulse section for forming a record mark, the recording pulse section including at least three upward pulses, among which an upward pulse between a first upward pulse and a last upward pulse has an intensity of Pw, Pbi and Pw being set so as to satisfy PbiH/PbiL<1 and (PbiH/PwH)/(PbiL/PwL)<1 where PbiL and PwL are Pbi and Pw when data are to be recorded at a linear recording velocity $V_L$ and PbiH and PwH are Pbi and Pw when data are to be recorded at a linear recording velocity $V_H$ which satisfies $1.1 \leq V_H/V_L$, the recording pulse section further including a downward pulse having a width of Tcl and following the last upward pulse and TclL and TclH being set so as to satisfy TclH/TclL<1 where TclL is Tcl when data are to be recorded at the linear recording velocity $V_L$ and TclH is Tcl when data are to be recorded at the linear recording velocity $V_H$, the optical recording medium being constituted so as to store pulse intensities and pulse widths used at the linear recording velocity $V_L$ and the linear recording velocity $V_H$.

42. An optical recording medium in accordance with claim 41, wherein the upward pulse between the first upward pulse and the last upward pulse has a width Tmp, and TmpL and TmpH are set so as to satisfy TmpH/TmpL$\leq$1 where TmpL is Tmp when data are to be recorded at the linear recording velocity $V_L$ and TmpH is Tmp when data are to be recorded at the linear recording velocity $V_H$.

43. An optical recording medium in accordance with claim 42, which is constituted so as to store a plurality of pulse intensities and a plurality of pulse widths used at each of the linear recording velocity $V_L$ and the linear recording velocity $V_H$ and so that a pulse intensity and a pulse width used for recording data in the optical recording medium are selected from among the plurality of pulse intensities and the plurality of pulse widths by test recording of data in the optical recording medium.

44. An optical recording medium in accordance with claim 42, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store the functions.

45. An optical recording medium in accordance with claim 42, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store a plurality of the functions for each of the linear recording velocity $V_L$ and the linear recording velocity $V_H$ and so that functions used for recording data in the optical recording medium are selected from among the plurality of the functions by test recording of data in the optical recording medium.

46. An optical recording medium in accordance with claim 41, wherein the first upward pulse has a width of Ttop, and TtopL and TtopH are set so as to satisfy TtopH/TtopL$\leq$1 where TtopL is Ttop when data are to be recorded at the linear recording velocity $V_L$ and TtopH is Ttop when data are to be recorded at the linear recording velocity $V_H$.

47. An optical recording medium in accordance with claim 46 which is constituted so as to store a plurality of pulse intensities and a plurality of pulse widths used at each of the linear recording velocity $V_L$ and the linear recording velocity $V_H$ and so that a pulse intensity and a pulse width used for recording data in the optical recording medium are selected from among the plurality of pulse intensities and the plurality of pulse widths by test recording of data in the optical recording medium.

48. An optical recording medium in accordance with claim 46, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store the functions.

49. An optical recording medium in accordance with claim 46, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store a plurality of the functions for each of the linear recording velocity $V_L$ and the linear recording velocity $V_H$ and so that functions used for recording data in the optical recording medium are selected from among the plurality of the functions by test recording of data in the optical recording medium.

50. An optical recording medium in accordance with claim 41, wherein the last upward pulse has a width of Tlp, and TlpL and TlpH are set so as to satisfy $1 \leq \text{TlpH}/\text{TlpL}$ where TlpL is Tlp when data are to be recorded at the linear recording velocity $V_L$ and TlpH is Tlp when data are to be recorded at the linear recording velocity $V_H$.

51. An optical recording medium in accordance with claim 50 which is constituted so as to store a plurality of pulse intensities and a plurality of pulse widths used at each of the linear recording velocity $V_L$ and the linear recording velocity $V_H$ and so that a pulse intensity and a pulse width used for recording data in the optical recording medium are selected from among the plurality of pulse intensities and the plurality of pulse widths by test recording of data in the optical recording medium.

52. An optical recording medium in accordance with claim 50, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store the functions.

53. An optical recording medium in accordance with claim 50, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store a plurality of the functions for each of the linear recording velocity $V_L$ and the linear recording velocity $V_H$ and so that functions used for recording data in the optical recording medium are selected from among the plurality of the functions by test recording of data in the optical recording medium.

54. An optical recording medium in accordance with claim 41 which is constituted so as to store a plurality of pulse intensities and a plurality of pulse widths used at each of the linear recording velocity $V_L$ and the linear recording velocity $V_H$ and so that a pulse intensity and a pulse width used for recording data in the optical recording medium are selected from among the plurality of pulse intensities and the plurality of pulse widths by test recording of data in the optical recording medium.

55. An optical recording medium in accordance with claim 41, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store the functions.

56. An optical recording medium in accordance with claim 41, wherein pulse intensities and pulse widths used at the linear recording velocity $V_L$ and the linear recording velocity $V_H$ are defined as functions of the linear recording velocity $V_L$ and the linear recording velocity $V_H$, the optical recording medium being constituted so as to store a plurality of the functions for each of the linear recording velocity $V_L$ and the linear recording velocity $V_H$ and so that functions used for recording data in the optical recording medium are selected from among the plurality of the functions by test recording of data in the optical recording medium.

57. An optical recording method for recording data in an optical recording medium having a recording layer containing a phase change material by irradiating it with a recording beam whose intensity is modulated between a plurality of power levels including at least a recording power and a bias power, a recording power PwL and a bias power PbiL when data are to be recorded at a first linear recording velocity and a recording power PwH and a bias power PbiH when data are to be recorded at a second linear recording velocity higher than the first linear recording velocity being set so as to satisfy PbiH/PbiL<1 and (PbiH/PwH)/(PbiL/PwL)<1.

58. An optical recording method in accordance with claim 57, wherein data are recorded so that the first linear recording velocity $V_L$ and the second linear recording velocity $V_H$ satisfy $1.1 \leq V_H/V_L \leq 8$.

59. An optical recording method in accordance with claim 57, wherein data are recorded so that a first linear recording velocity $V_L$ and a second linear recording velocity $V_H$ satisfy $1.1 \leq V_H/V_L \leq 4$.

60. An optical recording method in accordance with claim 57, wherein data are recorded so that a wavelength $\lambda$ of the recording beam and a numerical aperture NA of an objective lens of a recording beam projecting optical system satisfy $\lambda/\text{NA} \leq 680$.

61. An optical recording method in accordance with claim 60, wherein data are recorded so that the wavelength $\lambda$ of the recording beam and the numerical aperture NA of the objective lens of the recording beam projecting optical system satisfy $350 \leq \lambda/\text{NA} \leq 630$.

62. An optical recording apparatus for recording data in an optical recording medium having a recording layer containing a phase change material by irradiating it with a recording beam whose intensity is modulated between a plurality of power levels including at least a recording power and a bias power, a recording power PwL and a bias power PbiL when data are to be recorded at a first linear recording velocity and a recording power PwH and a bias power PbiH when data are to be recorded at a second linear recording velocity higher than the first linear recording velocity being set so as to satisfy PbiH/PbiL<1 and (PbiH/PwH)/(PbiL/PwL)<1.

63. An optical recording medium having a recording layer containing a phase change and in which data can be recorded by irradiating it with a recording beam whose intensity is modulated between a plurality of power levels including at least a recording power and a bias power, the optical recording medium storing information for setting recording conditions necessary for recording data under conditions where a recording power PwL and a bias power PbiL when data are to be recorded at a first linear recording velocity and a recording power PwH and a bias power PbiH when data are to be recorded at a second linear recording velocity higher than the first linear recording velocity are set so as to satisfy PbiH/PbiL<1 and (PbiH/PwH)/(PbiL/PwL)<1.

* * * * *